US007999685B2

(12) United States Patent
Sanchez et al.

(10) Patent No.: US 7,999,685 B2
(45) Date of Patent: Aug. 16, 2011

(54) DETERMINISTIC KEY PRE-DISTRIBUTION AND OPERATIONAL KEY MANAGEMENT FOR MOBLIE BODY SENSOR NETWORKS

(75) Inventors: David S. Sanchez, Terrassa Barcelona (ES); Heribert Baldus, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 701 days.

(21) Appl. No.: 11/916,764

(22) PCT Filed: May 31, 2006

(86) PCT No.: PCT/IB2006/051741
§ 371 (c)(1),
(2), (4) Date: Jul. 14, 2008

(87) PCT Pub. No.: WO2006/131849
PCT Pub. Date: Dec. 14, 2006

(65) Prior Publication Data
US 2009/0167535 A1 Jul. 2, 2009

Related U.S. Application Data

(60) Provisional application No. 61/688,648, filed on Jun. 8, 2005.

(51) Int. Cl.
*G08B 23/00* (2006.01)
*G01R 31/08* (2006.01)
*G06F 17/00* (2006.01)
*H04L 9/32* (2006.01)
*A61B 5/00* (2006.01)
(52) U.S. Cl. .............. 340/573.1; 340/573.4; 370/252; 715/230; 713/168; 600/300; 600/301

(58) Field of Classification Search ............. 340/573.1, 340/573.4; 715/230; 713/168; 128/903
See application file for complete search history.

(56) References Cited

U.S. PATENT DOCUMENTS
6,616,607 B2 * 9/2003 Hashimoto et al. ........... 600/300
(Continued)

OTHER PUBLICATIONS
Basagni, et al., "Secure Pebblenets", Proc. of the Second ACM Int'l Symposium on Mobile Ad Hoc Networking and Computing, pp. 156-163, 2001.
(Continued)

*Primary Examiner* — George Bugg
*Assistant Examiner* — Jack Wang

(57) ABSTRACT

A wireless network (2, 150) for monitoring a patient includes a body sensor network (22, 24, 26, 172, 174, 176) that includes one or more wireless sensors (6, 8, 10, 12, 14, 16, 18, 20, 156, 158, 160, 162, 164, 166, 168, 170) operatively connected to the patient that collect and transfer information related to the patient's health to the wireless network (2, 150). A set-up server (4, 154) configures the one or more wireless sensors (6, 8, 10, 12, 14, 16, 18, 20, 156, 158, 160, 162, 164, 166, 168, 170) with keying material before the one or more sensors (6, 8, 10, 12, 14, 16, 18, 20, 156, 158, 160, 162, 164, 166, 168, 170) are deployed to the wireless network (2, 150). A base station (178, 180) distributes a key certificate to the one or more sensors (6, 8, 10, 12, 14, 16, 18, 20, 156, 158, 160, 162, 164, 166, 168, 170) associated with the body sensor network (22, 24, 26, 172, 174, 176), such that two sensors generate a unique pairwise key based at least in part upon the pre-distributed keying material and the key certificate distributed by the base station (178, 180).

22 Claims, 15 Drawing Sheets

U.S. PATENT DOCUMENTS

| | | | |
|---|---|---|---|
| 7,234,063 B1 * | 6/2007 | Baugher et al. | 713/189 |
| 2004/0167465 A1 | 8/2004 | Mihai et al. | |
| 2004/0199056 A1 * | 10/2004 | Husemann et al. | 600/300 |
| 2004/0268119 A1 | 12/2004 | Smetters et al. | |
| 2005/0130634 A1 * | 6/2005 | Godfrey | 455/414.1 |
| 2005/0135305 A1 * | 6/2005 | Wentink | 370/329 |
| 2006/0252999 A1 * | 11/2006 | Devaul et al. | 600/300 |

OTHER PUBLICATIONS

Blom, "An Optimal Class of Symmetric Key Generation Systems", Proc. of the EUROCRYPT 84 Workshop on Advances in Cryptology:Theory and Application of Cryptographic Techniques, pp. 335-338, 1985.

Blundo, et al. "Perfectly Secure Key Distribution for Dynamic Conferences", Advances in Cryptology, CRYPTO 92, Springer-Verlag, Berlin, 1993, pp. 471-486.

Camtepe, S. A., et al.; Key Distribution Mechanisms for Wireless Sensor Networks: a Survey: Rensselaer Polytechnic Institute, Computer Science Department, Technical Report TR-05-07; 2005; pp. 1-27.

Camtepe, et al, "Combinatorial Design of Key Distribution Mechanisms for Wireless Sensor Networks", Proc. of Computer Security-EXORICS, Sringer-Verlag, LNCS 3193, 2004, p. 293-308.

Colborn, C. J., et al.; Applications of Combinatorial Designs in Computer Science; 1989; ACM Computing Surveys; 21(2)223-250.

Eschenauer, et al., "A Key-Management Scheme for Distributed Sensor Networks", Proc. of the Ninth ACM Conference on Computer and Communications Security, pp. 41-47, 2002.

Hwang, et al., "Revisiting Random Key Pre-Distribution Schemes for Wireless Sensor Networks" Proc. of the Second ACM Workshop on Security of Ad Hoc and Sensor Networks, 2004, p. 43-52.

Liu, et al. "Establishing Pairwise Keys in Distributed Sensor Networks", Proc. of the Tenth ACM Conference on Computer and Communications Security (CCS), 2003, pp. 52-61.

Menezes, et al., "Handbook of Applied Cryptography", Chapter 2 Mathematics Background, CRC Press, Oct. 1996.

Nadkarni, et al, "A Novel Intrusion Detection Approach for Wireless Ad Hoc Networks", WCNC 2004, IEEE Wireless Communications and Networking Conference, vol. 5, No. 1, Mar. 2004, pp. 831-836.

Newsome, et al. "The Sybil Attack in Sensor Networks: Analysis & Defenses", Proc. of the Third Int'l Symposium on Information Processing in Sensor Networks, pp. 259-268 (2004).

Perrig, et al., "SPINS: Security Protocols for Sensor Networks", Proc. of MOBICOM,2001.

Price, A., et al.; A Secure Key Management Scheme for Sensor Networks; 2004; Proc. 10th Americas Conf. on Information Systems.

Sanchez, D. S., et al.; A Deterministic Pairwise Key Pre-distribution Scheme for Mobile Sensor Networks; 2005; Securecomm 1st Int'l Conf.; pp. 277-288.

Shamir, A.; How to Share a Secret; Communications of the ACM, V. 22, Iss. 11, p. 612-613, 1979.

Zhang, et al, "Intrusion Detection in Wireless Ad-Hoc Networks", Proc. of the Sixth Int'l Conf. on Mobile Computing and Networking (MobiCom 2000), Boston, MA Aug. 2000.

Zhu, et al., "LEAP: Efficient Security Mechanisms for Large-Scale Distributed Sensor Networks", ACM Conference on Computer and Communications Security (CCS'03), pp. 62-72 (2003).

Di Pietro, et al. "Connectivity Properties of Secure Wireless Sensor Networks" SASN '04 Proceedings of the 2nd ACM workshop on Security of ad hoc and sensor networks ACM New York, NY, USA© 2004 ISBN:1-58113-972-1 doi>10.1145/1029102.1029112.

Brutch, et al. "Challenges in Intrusion Detection for Wireless Ad-hoc Networks" Proceedings of the Workshop on Security and Assurance in Ad-hoc Networks Orlando, FL; Jan. 26-31, 2003. Copyright© 2003 IEEE.

Du, et al. "A Pairwise Key Pre-distribution Scheme for Wireless Sensor Networks" CCS '03, Oct. 27-31, 2003, Washington, DC USA Copyright© 2003 ACM 1-58113-738-9/03/0010.

Lee, et al. "Deterministic Key Predistribution Schemes for Distributed Sensor Networks" Handschuh, et al. (Eds) SAC 2004, LNCS 3357, pp. 294-307, 2005 Springer Jan. 18, 2005 Copyright© 2005, Springer Berlin / Heidelberg.

* cited by examiner

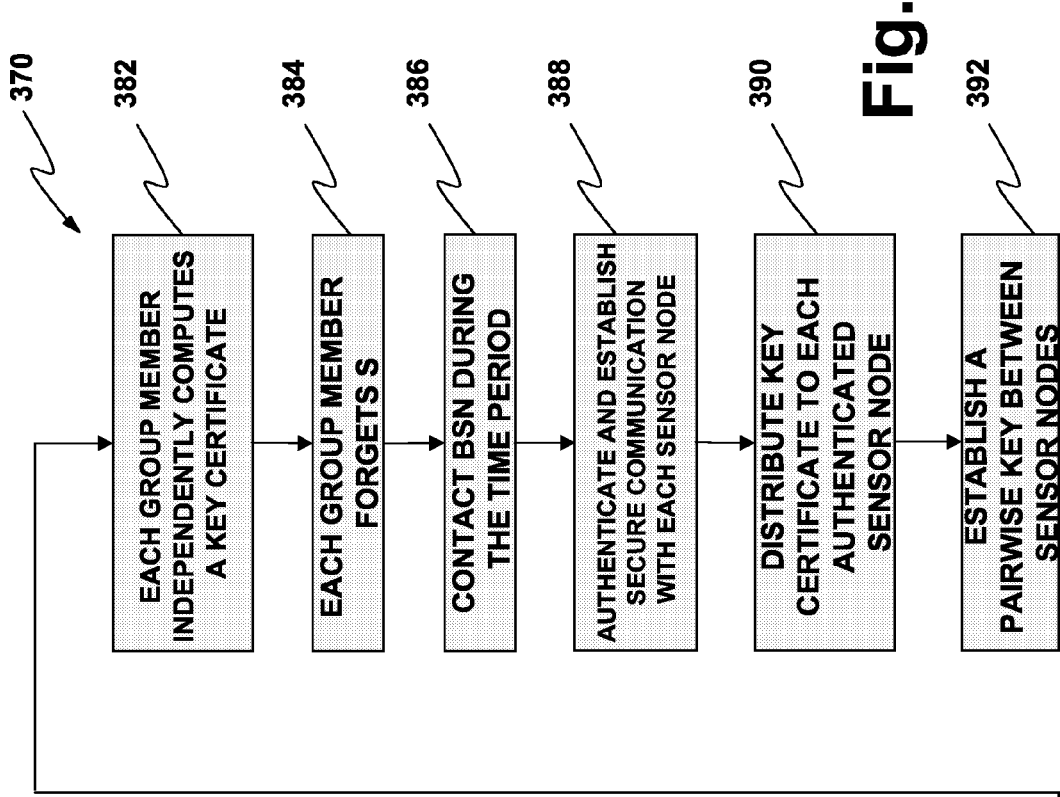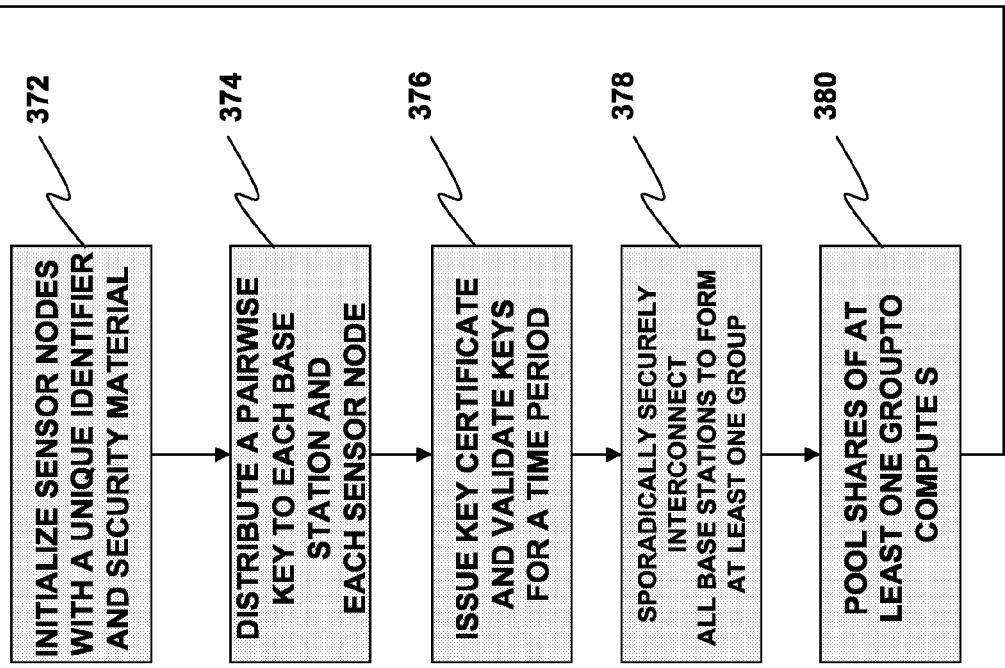
Fig. 15

DETERMINISTIC KEY PRE-DISTRIBUTION AND OPERATIONAL KEY MANAGEMENT FOR MOBLIE BODY SENSOR NETWORKS

CROSS REFERENCE TO RELATED APPLICATIONS

This application claims the benefit of U.S. provisional application Ser. No. 60/688,648 filed Jun. 8, 2005, which is incorporated herein by reference.

BACKGROUND OF THE INVENTION

The following relates to wireless networks. It finds particular application with the establishment of secure communication of information within a wireless body sensor network. However, it is to be appreciated that the invention may also find application in providing secure communication between other wireless devices and other wireless transponders.

Mobile body sensor networks (BSNs) have received attention for medical applications and are generally used for patient care and monitoring. A BSN includes data-collection nodes and optionally control nodes. Sensor nodes are battery powered, have limited computational capabilities and memory, and rely on intermittent wireless communication via radio frequency. Conventionally, a large group (e.g., thousands) of interoperable nodes are deployed in a medical area such as a hospital and then, by different means, spontaneously join to form different disconnected BSNs. The BSN is usually composed of a small subset (from 2 to 50 nodes) of all the nodes, e.g., the nodes assigned with an individual patient in the medical area. A priori, the size and membership of a BSN is unknown: BSN nodes may be present at the moment of BSN formation or may be added and deleted subsequently. Some nodes have limited mobility after formation of the BSN and others are highly mobile and often roam through different independent BSNs formed in the same area (e.g., data collection and control nodes carried by human users, sensors worn by persons, etc.). Some nodes might be left unattended. The lifetime of a BSN is limited to a few days, weeks, months, etc. The lifetime of sensor nodes typically is longer than the lifetime of a BSN instance. The BSN is formed in public or hostile areas where communication can be monitored and sensor nodes are subject to capture and manipulation by an unscrupulous individual. Cross talk between the nodes of BSNs associated with different patients could compromise the medical validity of the sensed data.

These challenging operational requirements place equally challenging security constraints on BSN design. Security services for BSN include authentication and communication confidentiality. Typically, key management services provide and manage the basic security material for satisfying the previously mentioned security services. The computational and communication constraints of BSN sensor nodes make it impractical to use any security solution based on public key cryptography. The ad hoc nature of BSNs and the operational requirements of BSN make typical online server-based solutions inappropriate.

Key management based on key pre-distribution schemes (KPS) is the one option for BSNs. The need for unique node authentication and key establishment, independently of the BSN membership and size, imposes strict requirements on a KPS for BSNs. However, existing KPS proposals are limited for BSNs. First, network wide key pre-distribution does not offer enough security or cannot be managed in BSNs. Second, trivial KPS is neither scalable nor manageable in BSNs. Third, the resiliency and scalability of Blundo's KPS (*Perfectly Secure Key Distribution for Dynamic Conferences*. In Advances in Cryptology—CRYPTO '92, Springer-Verlag, Berlin, 1993, pp. 471-486) is limited by the memory and computational power of sensor nodes. Fourth, random key pre-distribution does not offer good connectivity properties for BSN with a limited number of nodes. Finally, çamtepe and Yener deterministic KPS based on combinatorial design theory (*Combinatorial Design of Key Distribution Mechanisms for Wireless Sensor Networks*. In Proc. of Computer Security-ESORICS, Springer-Verlag, LNCS 3193, 2004, pp 293-308) has compatible connectivity properties and moderate resilience for BSNs but does not provide unique pairwise keys.

Basagni et al. (*Secure pebblenets*. In Proc. of the $2^{nd}$ ACM International Symposium on Mobile Ad Hoc Networking and Computing, pp. 156-163. 2001) presents a key management scheme to secure sensor communications by periodically updating the group symmetric key shared by all the sensor nodes. This scheme assumes tamper-resistant sensors and a distributed sensor network (DSN) wide connected management infrastructure, assumptions that are not applicable for BSNs (A large-scale DSN can be viewed as the interconnection of multiple BSNs with singular operational and networking differences. Alternatively, BSNs are seen as multiple disconnected splits of a large-scale DSN).

Perrig et al. (*SPINS: Security protocols for sensor networks*. In Proc. of MOBICOM, 2001) proposes SPINS, a security architecture specifically designed for sensor networks. In SPINS, each sensor node shares a secret key with the base station. Two sensor nodes cannot directly establish a secret key. However, they can use the base station as a trusted third party to set up the secret key. In BSNs, a base station may not be available at the moment of key establishment.

Blundo et al. proposes a polynomial-based KPS to derive group keys. For groups of two users, Blundo's key pre-distribution scheme can be used to establish pairwise keys in BSNs. A set-up server randomly generates a symmetric bivariate $\lambda$-degree polynomial $$f(x, y) = \sum_{i,j=0}^{\lambda} a_{ij} x^i y^j$$

over a finite field Fq wherein q is a prime number large enough to accommodate a cryptographic key. By the property of symmetry $f(x,y)=f(y,x)$. The setup server computes and distributes a polynomial share of $f(x,y)$ to for each sensor u, i.e. $f(u,y)$. Each sensor u has a unique identifier. After the deployment phase, for two arbitrary nodes u and v, node u can compute the common key $K_{uv}=f(u,v)$ by evaluating $f(u,y)$ at point v, and node v can compute the same key $K_{uv}=f(v,u)=f(u,v)$ by evaluating $f(v,y)$ at point u.

The resiliency, $\alpha$, of a Blundo's KPS is $\alpha=\lambda+1$, i.e. an attacker needs to compromise $\alpha$ sensors to be able to generate pairwise keys of non-compromised sensors. Each sensor node u requires storing a $\lambda$-degree polynomial share $f(u,y)$, which occupies $(\lambda+1)\log q$ storage space. It is to be appreciated that $\lambda$ is limited by the memory m available on sensors, i.e. $m \geq \lambda+1$ keys. There is no communication overhead during the pairwise key establishment process. To establish a pairwise key, both sensor nodes need to evaluate the polynomial at the ID of the other sensor node. This requires $\lambda$ modular multiplications and $\lambda$ modular additions in $F_q$, which can be costly in sensors with limited CPU capabilities.

Liu et al. (*Establishing pairwise keys in distributed sensor networks*. In Proc. of the 10th ACM Conference on Computer and Communications Security (CCS), 2003, pp. 52-61) describe a modification of polynomial evaluation to adapt to the restrictions imposed by low-bit CPUs with no division instruction and thus reduce computation requirements on sensors. This is achieved by reducing the length in bits of the coefficients of a $\lambda$-degree bivariate polynomial to log q' and by choosing q' of the form $q'=2^k+1$.

Liu et al. demonstrate that a key of log q bits can be compounded by concatenating the t partial keys generated with t $\lambda$-degree bivariate polynomial shares $\{f_i(u,y)\}_{i=1,\ldots,t}$ with coefficients on Fq', where $t=\lfloor \log q/\log q'\rfloor$, without a significant loss of security, i.e. the resulting log q-bit key possesses similar entropy as it had been generated with a $\lambda$-degree bivariate polynomial with coefficients on Fq. A joint set of t $\lambda$-degree bivariate polynomials $\{f_i(x,y)\}_{i=1,\ldots,t}$ with coefficients on Fq' is referred to a t-polynomial-set $F_t(x,y)$. The t-polynomial-set $F_t(u,y)$ evaluated at point u hereafter is a t-polynomial-set share.

The downside of this technique is that a polynomial over Fq' can only accommodate a maximum of q'−1 sensors (instead of q−1). Particularly, t polynomials over Fq' combined in parallel (i.e. a t-polynomial-set) can only accommodate a maximum of N'=q'−1 nodes. For instance, for 8-bit CPUs, $q'=2^8+1$ offers optimal computational performance but, then, the number N' of maximum nodes is 256. A property still holding is that each bivariate polynomial $\{f_i(x,y)\}_{i=1,\ldots,t}$, over Fq', and, thus, a t-polynomial-set, is $\lambda$-collusion resistant. The polynomial split technique can be applied to any polynomial-based KPS, under certain lower bound on $\lambda$ imposed by q, q' and the total number of polynomials over Fq' used by the KPS.

A balanced incomplete block design (BIBD) is an arrangement of v distinct objects into b blocks such that each block contains exactly k distinct objects, each object occurs in exactly r different blocks, and every pair of distinct objects occurs together in exactly t blocks. The design can be expressed as (v, k, t), or equivalently (v, b, r, k, t), where: t(v−1)=r(k−1) and bk=vr.

In a symmetric BIBD (SPIBD) b=v and, thus, k=r. A SPIBD has four properties: every block contains k=r elements, every element occurs in k=r blocks, every pair of elements occurs in t blocks and every pair of blocks intersects in t elements.

Given a block design D=(v, k, t) with a set S of |S|=v objects and a set B=$\{B_1, B_2, \ldots B_b\}$ of |B|=b blocks where each block includes exactly k objects, a complementary design $\overline{D}$ has the complement blocks $\overline{B_i}$=S−$B_i$ as its blocks for $1 \leq i \leq b$. $\overline{D}$ is a BIBD with parameters (v,b,b−r,v−k,b−2r+t), where b−2r+t>0. If D=(v,k,t) is an SBIBD, then $\overline{D}$ is also an SBIBD.

Finite Projective Planes (FPP) is a subset of SPIBDs of special interest for key pre-distribution. An FPP is an SPIBD with parameters ($n^2+n+1$, n+1,1). An FPP exists for any prime power n, where $n \geq 2$. FPP of order n has four properties: (i) every block contains exactly n+1 points, (ii) every point occurs on exactly n+1 blocks, (iii) there are exactly $n^2+n+1$ points, and (iv) there are exactly $n^2+n+1$ blocks. çamtepe and Yener (*Combinatorial Design of Key Distribution Mechanisms for Wireless Sensor Networks*. In Proc. of Computer Security-ESORICS, Springer-Verlag, LNCS 3193, 2004, pp 293-308) apply SBIBD design for key pre-distribution in SNs.

Assume an FPP with parameters ($n^2+n+1$, n+1,1), with elements belonging to a set S, where $|S|=n^2+n+1$. Using Eschenauer and Gligor (*A key-management scheme for distributed sensor networks*. In Proc. of the 9th ACM conference on Computer and communications security, pp. 41-47, 2002) terminology, S is associated with a key pool i.e. each element in S is associated with a distinct random key. Further, each block of FPP is associated with a key ring. The properties of FPPs guarantee that any pair of key rings (blocks) has 1 random key (element) in common.

For a sensor network (SN) of N nodes, with total of N key rings, an FPP with $n^2+n+1 \geq N$ blocks needs to be constructed by using set S. That provides $n^2+n+1 \geq N$ key rings each having K=n+1 keys and one key in common. The memory size required on nodes is then (n+1)×log q (equivalently m=n+1). A wise attacker needs to capture $\alpha$=K=n+1 nodes to be able to compromise the SN.

Each sensor node of an N-population SN receives a different key ring. Observe that every two nodes share a specific key in common. Actually, because of the properties of FPPs, each n+1 sensors share the same specific key. Consequently, the keys of this KPS cannot be used for node unique authentication. A second related problem is that it is not always possible to find an FPP in which (i) n is a prime power and (ii) $n^2+n+1 \geq N$, with the limitation $m \geq n+1$.

çamtepe and Yener solve the above problem by constructing a Hybrid Design, which includes $n^2+n+1$ blocks of an FPP ($n^2+n+1$, n+1,1) where n<m−1 (i.e. now the size of the key ring $m \geq K > n+1$) and N−$n^2+n+1$ arbitrarily selected (n+1)-element sub-blocks of $\overline{FPP}$ ($n^2+n+1$, $n^2$, $n^2-n$). The side effects are: (i) K>n+1, (ii) some specific keys are shared by more than n+1 nodes, (iii) some pairs of nodes may share up to $n^2-n$ keys in common and (iv), at least N−$n^2+n+1$ blocks do not have a key in common. Thus, because of (iv), at least N−$n^2+n+1$ cannot directly establish a common key, and because of (i), (ii), and (iii), $\alpha \leq n+1 < K \leq m$, i.e. the network resiliency lowers.

Recently, a number of random key management schemes based on key pre-distribution have been proposed for securing the communication infrastructure of large-scale DSN. Such management schemes assume DSN-wide connectivity based on the assumptions that a sensor node is able to wirelessly connect to a minimum degree of neighbor nodes (e.g., nodes in wireless communication range) and that sensor nodes have very restricted mobility after deployment. These schemes aim at maximum DSN-wide secure connectivity and network resiliency yet satisfying operational constraints of DSNs. In random key pre-distribution schemes each node receives, before deployment, a random subset of keys from a large key pool. To agree on a key for secure communication with certain probability, two neighbor nodes find one common key within their subsets and use that key as their shared secret key. Two sensor nodes, which do not find a common key, make use of other trusted nodes in their neighborhood or even some hops away to help establishing a common key. Random pairwise key pre-distribution schemes based on Blom's (*An optimal class of symmetric key generation systems*. In Proc. of the EUROCRYPT 84 workshop on Advances in cryptology: theory and application of cryptographic techniques, pp. 335-338, 1985) or Blundo's schemes enhance the former by increasing network resiliency and additionally providing for node authentication.

However, random key pre-distribution schemes are not suited to secure BSNs. First, due to the small degree of neighboring nodes, the BSN does not always enable two arbitrary nodes to directly or indirectly establish a common key. Second, due to the possibility of node captures, node authentication should be performed directly without any intermediaries.

Since independent BSNs are not interconnected, centralized or distributed global intrusion detection systems (IDS) suggested for DSNs or for ad hoc networks cannot be used in BSNs. A compromised node might be detected in a BSN, but conventional systems and methods do not efficiently distribute this information to the rest of nodes in other BSNs. Therefore, BSNs are far more vulnerable to node replication attacks than a large-scale DSN. In hospitals, for example, attacks from the smart attacker are the largest threat for BSN security. Although not clearly stated in literature, network resiliency against node captures and node replication of former key pre-distribution schemes highly depends on the existence of a DSN-wide effective IDS. Iresiliency of the network is defined as a number $\lambda$ of nodes that an attacker needs to capture to compromise a fraction of total DSN communications. A smart attacker does not bother capturing and tampering $\lambda$ nodes to mount an attack. The smart attacker just captures one or a small fraction of nodes and uses the compromised keys to attack the network. Actually, to go undetected, the attacker does not try to disrupt the network operations of the network, but attempts to read or modify confidential information or even inject false messages. In this manner, the attacker may acquire and/or inject the desired information without even having to waste their own resources to compromise other network communications.

Finally, the key establishment mechanism assisted by neighbors is needed in some schemes to achieve a high degree of secure DSN connectivity. An attacker with the appropriate keys can obtain assistance from one or more adjacent nodes, nodes adjacent to such nodes, and so on to establish keys with the complete neighborhood. If secure connectivity is sacrificed to improve security by restricting the key establishment assistance to the node's neighborhood, the attacker is still able to move and try to attack as many neighborhoods as possible. An effective and secure key management scheme must consider the smart attacker, especially in BSN settings.

What is needed is a key pre-distribution scheme that enables authentication, confidentiality and integrity services and provides increased network secure connectivity, resiliency and scalability coupled with optimal performance efficiency. It is also needed a key management scheme, which controls usage of pre-distributed keys, suitable for the operational conditions of BSNs. The present invention contemplates an improved apparatus and method that overcomes the aforementioned limitations and others.

BRIEF SUMMARY OF THE INVENTION

According to one aspect, a wireless network for monitoring a patient comprises a body sensor network consists of one or more wireless sensors operatively connected to the patient that collect and transfer information related to the patient's health to the wireless network. A set-up server configures the one or more wireless sensors with keying material before the one or more sensors are deployed to the wireless network. A mobile base station distributes a key certificate to the one or more sensors associated with the body sensor network, wherein two sensors generate a unique pairwise key based at least in part upon the pre-distributed keying material and the key certificate distributed by the base station.

According to another aspect, a wireless network includes a network consists of one or more wireless nodes and a set-up server that configures the one or more wireless nodes with keying material before the one or more nodes are deployed to the wireless network. A base station distributes a key certificate to the one or more sensors associated with the network, wherein two nodes generate a unique pairwise key based at least in part upon the pre-distributed keying material and the key certificate distributed by the base station.

According to yet another aspect, a method evaluates and distributes t-polynomial-set shares using a combinatorial distribution in order to maximize the scalability, resiliency and performance efficiency of a wireless system that includes pre-distributing a security key via a setup server to a sensor node u and a sensor node v that communicate on the wireless system.

According to yet another aspect, a method identifies a sensor u in a mobile sensor system that includes developing a finite projective plane ($n^2+n+1$, $n+1$, 1) from a set of $n-1$ mutually orthogonal Latin squares of order n, where n is a prime power. A common t-polynomial-set share is efficiently discovered and a t-polynomial-set share evaluation point is efficiently derived by a sensor v from u's sensor identifier.

One advantage of the present invention is that it provides security keys to a large population of sensor nodes optimizing communication, computational and storage efficiency on battery, CPU-power and memory constrained nodes.

Another advantage is that it provides enhanced security strength to pre-distributed security keys to a large population of sensor nodes.

Another advantage is that the security is provided transparent to the users of the wireless network.

Another advantage is that security is provided, which enables unique identity authentication of whatever arbitrary pair of sensor nodes (of a large population of sensors) and the establishment of trust relationships independently of the sensors wireless neighborhood density or size, Another advantage is that the security mitigates the extent to which the wireless network can be compromised.

Numerous additional advantages and benefits will become apparent to those of ordinary skill in the art upon reading the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 4 also shows how to use the sensor identifier in a mobile sensor system, such as the system in FIG. 1.

FIG. 15 illustrates a method to manage pre-distributed keys.

DETAILED DESCRIPTION OF THE PREFERRED EMBODIMENTS

Deterministic Pairwise Key Pre-distribution System (DPKPS) and Methods

Figure 1:
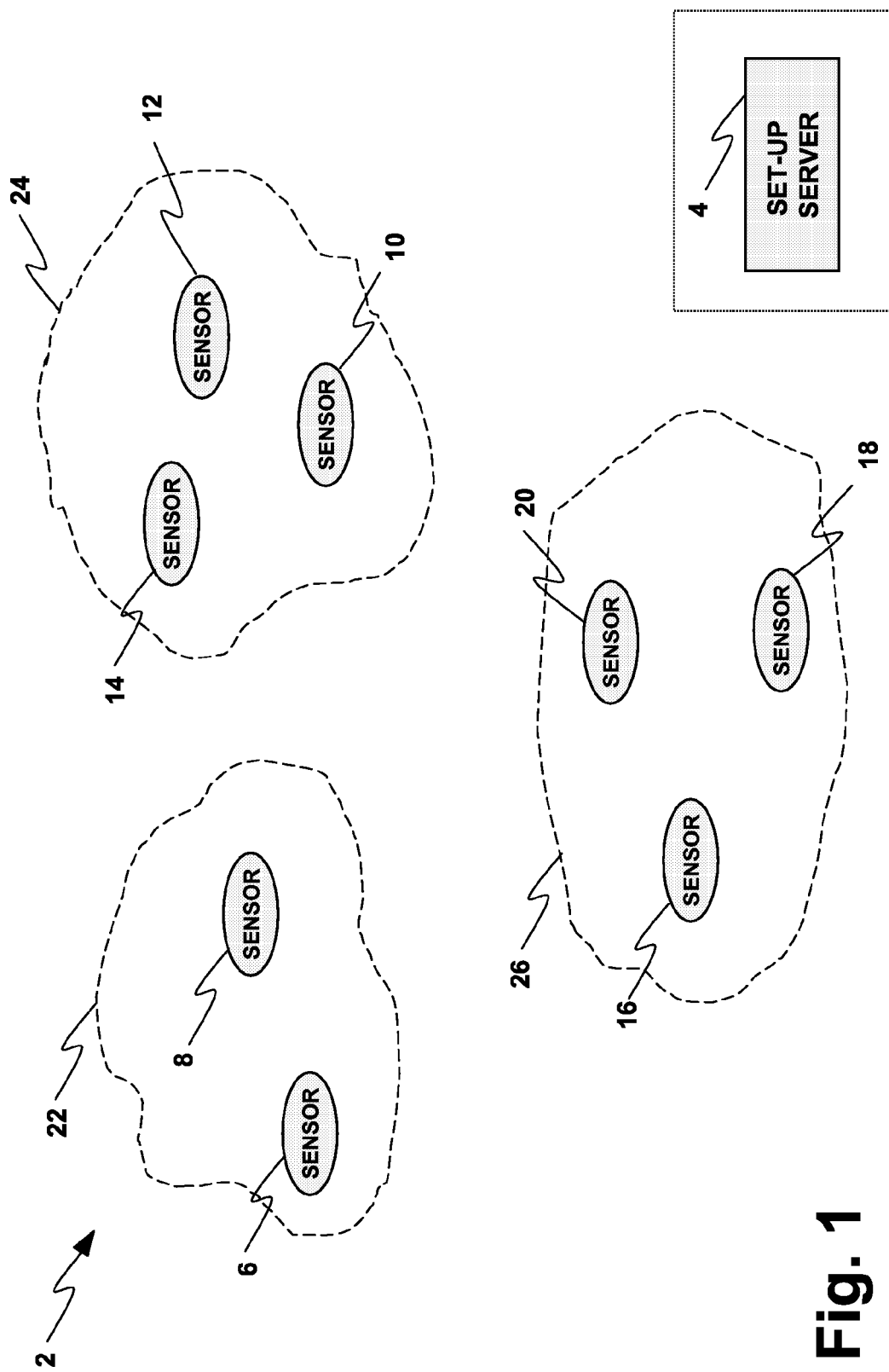
FIG. 1 illustrates a mobile sensor system that employs a set-up server to configure keying material in a plurality of sensors during a pre-deployment phase.

FIG. 1 illustrates a mobile sensor system 2 that includes a setup server 4, a plurality of wireless sensors 6, 8, 10, 12, 14, 16, 18 and 20 and a plurality of body sensor networks 22, 24, and 26. The set-up server 4 is a security dedicated server, which has an active participation in security only before the deployment of sensors. The wireless sensors 6-20 connect to the set-up server 4 in an initial configuration phase (e.g., pre-deployment) before the sensors 6-20 are used. The set-up server 4 typically resides in a physically protected perimeter, only accessible to authorized personnel. During the deployment phase, the wireless sensors do not have any means of contacting the set-up server. The deployment area is typically publicly accessible. The wireless sensors 6-20 are nodes in charge of collecting and transferring patient medical data. Any of the sensors 6-20 establishes wireless connections with one or more of the sensors 6-20. Sensor nodes are memory, battery, and CPU constrained. The body sensor networks (BSN) 22-26 are a collection of wireless networked sensor nodes, which may be attached to one or more patients (not shown). The BSNs 22-26 are typically bandwidth constrained due to the large number of nodes in a system. For example, in a hospital environment there might be hundreds or thousands of BSNs (e.g., one for each patient).

The BSN application requires keys of log q bits. In accordance with an embodiment, $t=\lfloor \log q/\log q' \rfloor$, being $t \geq 1$. Fixed q to the required security level (e.g. 64 bits), polynomials in Fq' can be calculated and apply Liu et al. polynomial optimization to obtain a key of log q bits. A joint set of t λ-degree bivariate polynomials $\{f_i(x,y)\}_{i=1,\ldots,t}$ with coefficients on Fq' is referred to a t-polynomial-set $F_i(x,y)$. The t-polynomial-set $F_i(u,y)$ evaluated at point u hereafter is a t-polynomial-set share.

Figure 2:
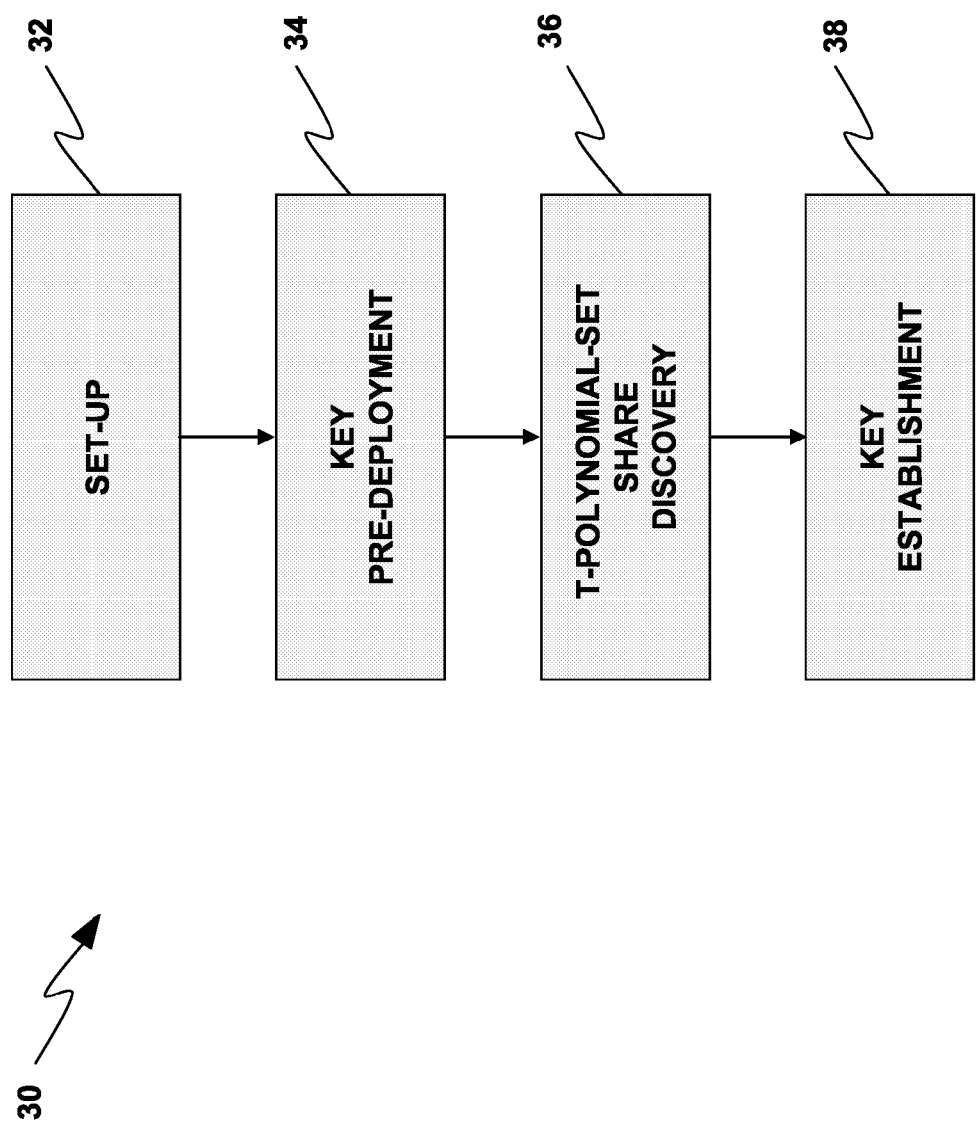
FIG. 2 illustrates a methodology to provide secure communication between a pair of wireless sensors utilizing unique pairwise keys.

FIG. 2 illustrates a methodology 30 that consists of a set-up method 32, a key pre-deployment method 34, a t-polynomial-set shares discovery method 36, and a key establishment method 38 employed to establish unique pairwise keys between sensors such as with system 2 above. At 32, a set-up server generates t-polynomial-set shares and a combinatorial design, which can be used to accommodate N sensors, where N is the size of the group of interoperable nodes and is an integer greater than or equal to one. At 34, the set-up server distributes t-polynomial-set shares to each sensor according to the combinatorial distribution. Once deployed, at 36, two arbitrary sensors u and v find which t-polynomial-set share they have in common. At 38, the two arbitrary sensors u and v generate a unique pairwise key $K_{uv}$, by evaluating their common t-polynomial-set share.

One aspect of the present embodiment increases the scalability of a KPS based on t-polynomial-sets without decreasing its resilience while maintaining optimal nodal performance efficiency. In one approach, n+1 t-polynomial-sets are distributed to each node u following an FPP-$(n^2+n+1, n+1,1)$, i.e. by associating N'/(n+1) distinct shares of each t-polynomial-set $F_{b_{i,j}}(x,y)$ with each element $b_{i,j}, j=1 \ldots n+1$ belonging to blocks $B_i, i=n^2+n+1$, of the FPP. Because of the properties of FPPs, two arbitrary nodes u and v, with respective n+1 t-polynomial-set shares distributed according to the elements of different blocks $B_i, B_j \in$ FPP, $i \neq j$, share one t-polynomial-set $F_k(x,y)$, which they can use to compute a unique pairwise key of log q bits. Similarly, two nodes, with respective n+1 t-polynomial-set shares distributed according to the elements of the same block $B_i \in$ FPP, have n+1 t-polynomial-set shares in common. In this manner, the nodes can use any of the n+1 t-polynomial-set shares to compute a unique pairwise key of log q bits.

This technique enables increasing the scalability of Blundo et al. as well as Çamtepe and Yener KPSs without any loss in network resiliency and while keeping computational performance at optimum and probability one of sharing a unique pairwise key. Additionally, such an approach solves the FPP existence problem of Çamtepe and Yener KPS without a downside in network resiliency or direct trust connectivity.

At 32, the set-up server randomly generates a set $\Im$ of $t \times (n^2+n+1)$ λ-degree bivariate polynomials $\{f_j^i(x,y)\}_{j=1 \ldots n^2+n+1}^{i=1 \ldots t}$ over Fq'. Subsequently, for $j=1 \ldots n^2+n+1$, the set-up server sequentially picks t polynomials from $\Im$, and forms $n^2+n+1$ t-polynomials-sets $F_j(x,y)$. Then, it generates an FPP-$(n^2+n+1, n+1,1)$, with elements belonging to a set S, where $|S|=n^2+n+1$. The set S is associated with a polynomial pool i.e. each element j in S is associated with a distinct t-polynomial-set $F_j(x,y)$. Further, each block of FPP is associated with a polynomial ring. The properties of FPPs guarantee that any pair of polynomial rings (blocks of FPP) has one t-polynomial-set $F_k(x,y)$ (element k) in common.

At 34, each sensor node u receives from the set-up server n+1 t-polynomial-set shares $F_{b_{i,j}}(p_{u,j},y)$, where $p_{u,j} \in$ Fq', $b_{i,j} \in B_i \in$ FPP and $j=1 \ldots n+1$. The point $p_{u,j}$ must be taken from a finite field Fq'. This restricts $p_{u,j}$ to q'−1 different possible values. However, the number of sensors N to accommodate may be greater than q'−1. To guarantee uniqueness of pairwise keys, two different sensors u and v cannot have the same t-polynomial-set $F_k(x,y)$ evaluated in the same point $p_k$. Since each t-polynomial-set $F_j(x,y)$, $j=1 \ldots n^2+n+1$, can be evaluated in N'=q'−1 different points and the index j of $F_j(x,y)$ appears in n+1 FPP blocks, then each of these blocks (where j occurs) shall be used to pre-distribute distinct shares of $F_j(x,y)$ to no more than N'/(n+1) different sensors. The key pre-distribution process to accommodate $N \leq N'n(1-1/(n+1))+N'$ nodes employs the following steps:

1. Starting with the first block $B_1$ of FPP with elements $\{b_{1,1}, \ldots b_{1,n+1}\}$, the first node ($u_1$) receives t-polynomials-set shares $F_{b_{1,1}}(p_1,y)$ to $F_{b_{1,n+1}}(p_1,y)$ evaluated at point $p_1$ of Fq'; the second sensor ($u_2$) receives $F_{b_{1,1}}(p_2,y)$ to $F_{b_{1,n+1}}(p_2,y)$ evaluated at point $p_2$; and, so forth; till the N'/(n+1)-th sensor ($u_{N'/(n+1)}$) receives $F_{b_{1,1}}(p_{N'/(n+1)},y)$ to $F_{b_{1,n+1}}(p_{N'/(n+1)},y)$ evaluated at point $p_{N'/(n+1)}$.

2. Following with the second block $B_2$ of FPP with elements $\{b_{2,1} \ldots, b_{2,n+1}\}$, assume $b_{1,1}=b_{2,1}$, sensor $u_{1+N'/(n+1)}$ receives $F_{b_{1,1}}(p_{1-N'/(n+1)},y)$ which is evaluated at point $p_{1+N'/(n+1)}$ (because $F_{b_{1,1}}(x,y)$ is already evaluated in lower points for sensors $u_1 \ldots u_{N'/(n+1)}$), and $F_{b_{2,2}}(p_1,y)$ to $F_{b_{2,n+1}}(p_1,y)$ evaluated at point $p_1$; and so forth, and 3. Repeat steps one and two to accommodate the N nodes of the system using all the blocks of the FPP.

At 36, the t-polynomial-set shares are discovered. After deployment, before establishing a pairwise key, each sensor node u must discover which t-polynomial-set it shares with its partner node v. For that, nodes u and v exchange their IDs, which implicitly contain the indices of the n+1 t-polynomial-set shares they carry and the points $p_{u_1} \ldots p_{u_{n+1}}, p_{v_1} \ldots p_{v_{n+1}}$ where the respective n+1 t-polynomial-set shares are evaluated. Finally, they find an index k (corresponding to the common t-polynomial-set $F_k(x,y)$) and the respective evaluation points $p_u$ and $p_v$.

At 38, a key is established. To calculate a pairwise key $K_{uv}$, node u evaluates the t λ-degree bivariate polynomials $f_k^i(p_u,y)$ (included in $F_k(p_u,y)$), for i=1 ... t at point $p_v$ (i.e. $f_j^i(p_u,p_v)$) to obtain t partial keys. Then, node u truncates the t partial keys to log q' bits and concatenates the t key segments to form a final pairwise key $K_{uv}$ of log q bits.

Simple Sensor ID

Figure 3:
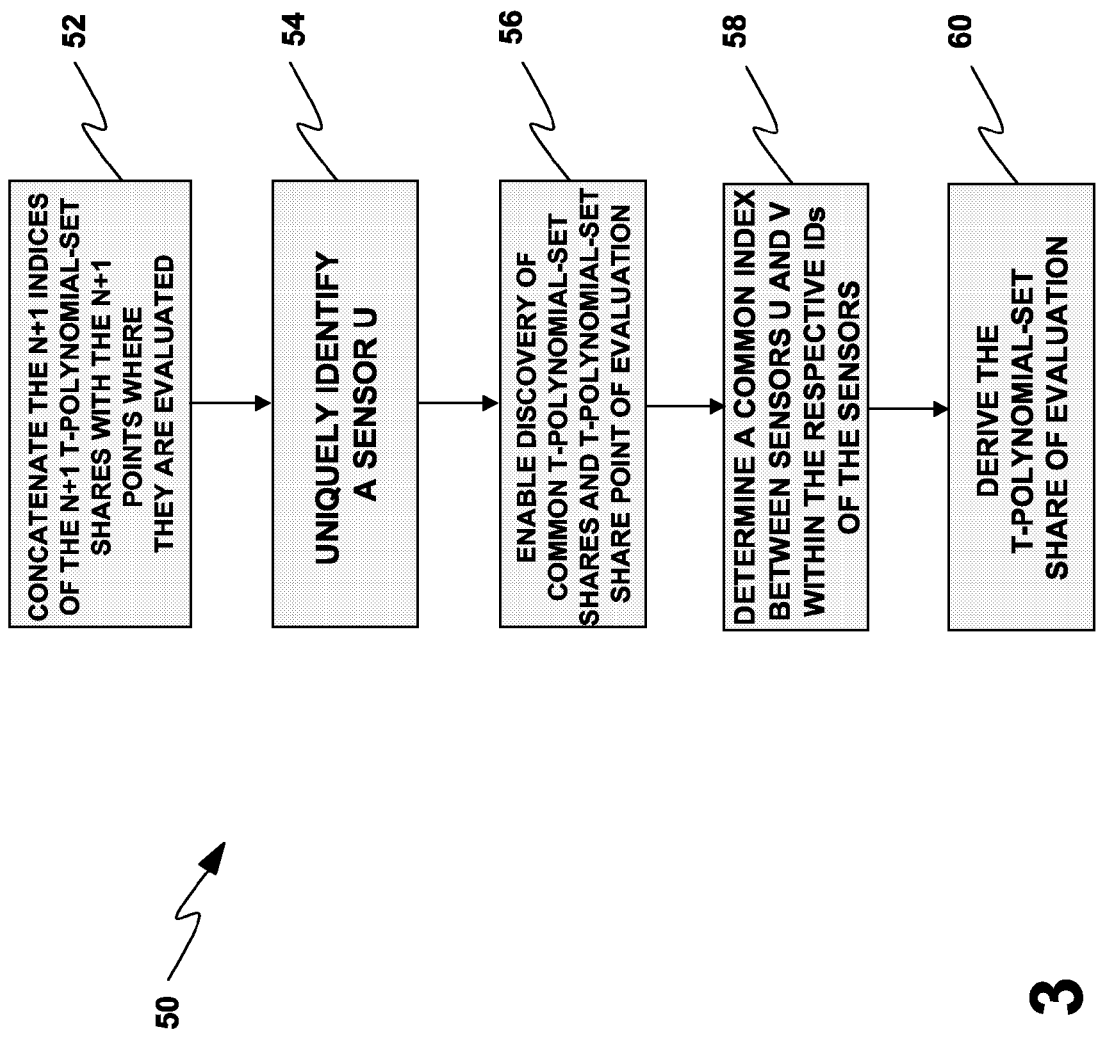
FIG. 3 also shows how to use the sensor identifier in a mobile sensor system, such as the system in FIG. 1.

FIG. 3 illustrates a method 50 that identifies a sensor u in the DPKPS. At 52, n+1 indices $b_{i,1}, \ldots b_{i,n+1}$ of the n+1 t-polynomial-set shares it carries are concatenated with the n+1 points $p_{u_1} \ldots p_{u_{n+1}}$ where they are evaluated. At 54, such an ID uniquely identifies a sensor u and, at 56, enables very simple discovery of common t-polynomial-set shares and t-polynomial-set share point of evaluation.

At 58, a common t-polynomial-set share is discovered by using the simple sensor ID two sensors u and v find which index is in common within the respective IDs, e.g. index k. At 60, the t-polynomial-set share point of evaluation is derived getting the k-th point included in the simple sensor ID.

Optimized Sensor ID

Because using simple sensor IDs considerably augments the storage and communication costs of the DPKPS when n grows, an alternative optimized sensor ID method can be employed by exploiting the properties of FPPs based on mutually orthogonal Latin squares (MOLS). This optimized method constructs sensor IDs with very short length for practical values of n.

Figure 4:
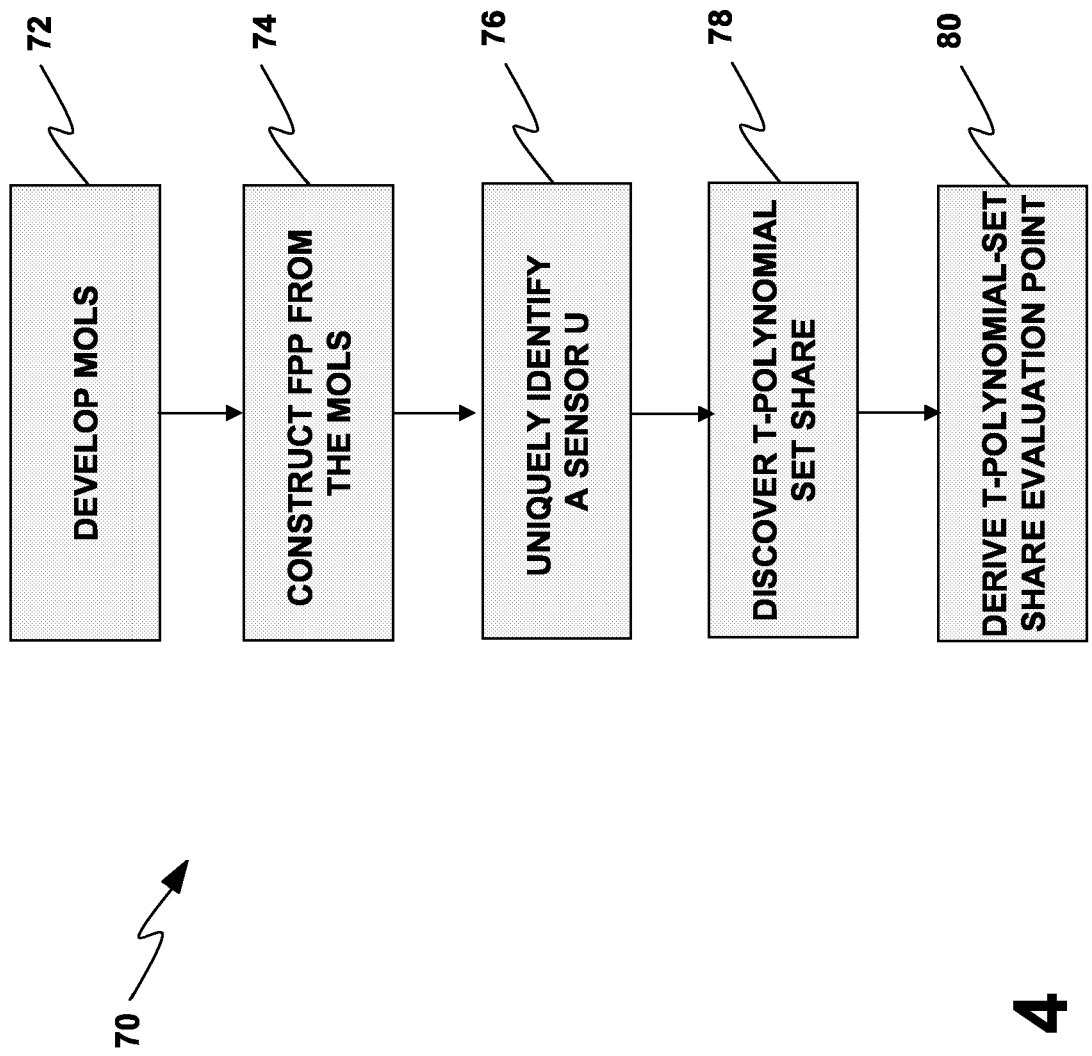
FIG. 4 illustrates another methodology to identify a sensor in a mobile sensor system, such as the system in FIG. 1.

FIG. 4 shows a methodology 70 employed to identify a sensor in a mobile sensor system, such as system 2 above.

An FPP ($n^2+n+1$, n+1,1) is developed from a set of n−1 mutually orthogonal Latin squares (MOLS) of order n. A Latin square is an n×n square matrix L whose entries consist of n symbols such that each symbol appears exactly once in each row and each column. The symbols are used as integers from 1 ... n. A very simple way to construct L is by placing the integers 1, 2, ... n in their natural order in the first row and, for consecutive rows, by cyclically rotating the previous row to the right.

At 72, mutually orthogonal Latin squares (MOLS) are developed. Two Latin Squares $L^1|l_{ij}^1|$ and $L^2|l_{ij}^2|$ on n symbols 1, 2, ... n are orthogonal if, when superimposed, each of the $n^2$ pair of symbols $(l_{ij}^1, l_{ij}^2)$, i=1, 2 ... n; j=1, 2 ... n, occurs exactly once. A set of Latin squares $L^1, L^2, \ldots L^t$ of the same order n, each of which is an orthogonal mate of each of the others, is called a set of MOLS. A set of n−1 MOLS of order n is a complete set.

Given a pair of orthogonal Latin squarest $L^1=|l_{ij}^1|$ and $L^2=|l_{ij}^1|$, the cells in the first square contain one particular symbol $l^1$. Due to the properties of Latin squares, there is only one of these cells in each row and column. By orthogonality, the n entries in the cells of the orthogonal mate, which correspond to the cells in the first square, form a transversal in the orthogonal mate, e.g. the n entries contain every symbol precisely one and each of these cells is in different rows and columns.

For n a prime power, the set of polynomials of the form $f_a(x,y)=ax+y, a\ne 0 \in F_n$ represents a complete set of n−1 MOLS of order n. This leads to a very simple construction method: let $e_1, e_2, \ldots e_n$ be the elements of $F_n$, i.e. the integers 1 ... n. Then, for each element $e_m$, m=1, 2 ... n, the elements $l_{ij}^{e_m}$ of the matrix $L^{e_m}=|l_{ij}^{e_m}|$ are sequentially calculated by:

$$l_{ij}^{e_m}=(e_m \times e_i)+e_j \qquad \text{(Equation 1)}$$

The parameters n and $e_m$ are sufficient to reconstruct a specific orthogonal Latin square $L^{e_m}=|l_{ij}^{e_m}|$.

At 74, a finite projective plane (FPP) is constructed from the MOLS. Let $L^1, L^2, \ldots L^{n-1}$ be a complete set of MOLS of order n and M an n×n matrix. Initially, matrix M is to be constructed by placing the $n^2$ integers 1 ... $n^2$ in their natural order from the first to the n-th rows. Secondly, an Affine Plane $AG^{(2,n)}$ of order n is generated from the MOLS as follows: (i) the first n blocks are the rows of M, (ii) the second n blocks are the columns of M, and (iii) the remaining $n^2-n$ blocks are formed by sequentially superimposing each $L^{e_m}$ on M, and taking as blocks the elements of M which correspond to a single symbol $l^{e_m}$ in each $L^{e_m}$. Since each $L^{e_m}$ contains n different symbols, each $L^{e_m}$:M superposition yields n blocks. Finally, to obtain an FPP ($n^2+n+1$, n+1,1), (i) add a new integer $n^2+1$ to the first n blocks of the Affine Plane, (ii) add a new integer $n^2+2$ to the second n blocks, (iii) add an integer $n^2+2+e_m$ to the n blocks constructed from each $L^{e_m}$, and (iv) add a new block to the design, which contains the n+1 new added integers.

Given n and i, it is simple to reconstruct a block $B_i \in FPP$, $1 < i \leq 2n$. For instance, for n=3, block $B_4$ is constructed from the first column of M 3×3 and the integer 11, i.e. $B_4=(1, 4, 7, 11)$. For a block $B_i \in FPP$, $2n < i \leq n^2+n$, index i also implicitly identifies the index $e_m$, $1 \leq e_m \leq n-1$, of the Latin square $L^{e_m}$, from which $B_i$ is generated. For instance, for n=3, block $B_{12}$ is generated from $L^2$. To reconstruct one of these blocks $B_i$, $2n < i \leq n^2+n$ the element $l^{e_m}$ is additionally required.

At 76, a sensor u is identified concatenating the three numbers i, $i_p$, and $l^{e_m}$, where $1 \leq i \leq n^2+n+1$, $1 \leq i_p \leq N'/(n+1)$ and $1 \leq e_m \leq n$. The first, i, identifies a block $B_i \in FPP$ according to which the t-polynomial-set shares of u are chosen, the second, the turn $i_p$ in the distribution of t-polynomial-set shares to u within $B_i$ and, the third, an element of a Latin square $L_i$ from which $B_i$ is derived. Such an ID uniquely identifies a sensor u and enables much more efficient discovery of common t-polynomial-set shares and t-polynomial-set share point of evaluation than with simple ID.

At 78, the t-polynomial-set share is discovered for the optimized sensor ID. At 80, a t-polynomial-share evaluation point is derived for the optimized sensor ID.

Figure 5:
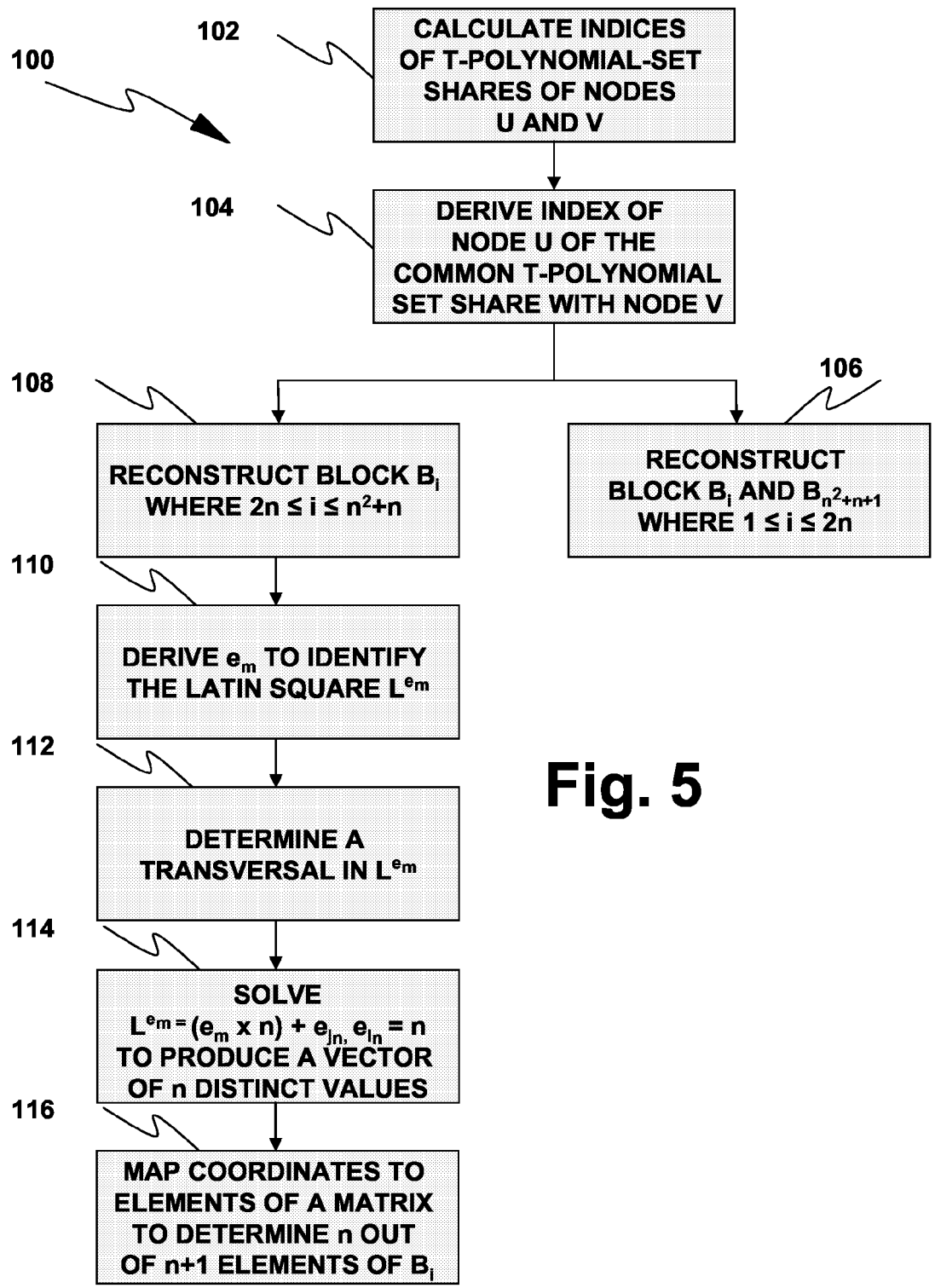
FIG. 5 illustrates a methodology to discover a common t-polynomial-set share.

FIG. 5 shows a method 100 to discover a common t-polynomial-set share by using the information contained in an optimized sensor ID. At 102, the optimized sensor ID enables a sensor node u to calculate the indices of its own t-polynomial-set shares and those of a partner node v. At 104, by comparing this information, node u can derive the index k, $1 \leq k \leq n^2+n+1$, of the common t-polynomial-set share $F_k(p_u, y)$ with node v.

The indices of the t-polynomial-set shares $F_{b_{ij}}(p_{u_j},y)$, j=1 ... n+1, which a sensor u carries, are a one-to-one mapping to the elements $\{b_{i,1}, b_{i,2}, \ldots b_{i,n+1}\}$ of a $B_i \in FPP$. As noted above, given n, index i of $B_i$ and an integer $l^{e_m}$, it is possible to uniquely reconstruct $\{b_{i,1}, b_{i,2}, \ldots b_{i,n+1}\}=B_i$. Here we have to distinguish two cases: At 106, blocks $B_i$, $1 \leq i \leq 2n$, and $B_{n^2+n+1}$, whose reconstruction is trivial. Alternatively, at 108, blocks $B_i$, $2n < i \leq n^2+n$, whose reconstruction is also simple but requires the following analysis. At 108, it is known by step (iii) of the construction of Affine Planes (at step 54 from FIG. 3a) that the elements $\{b_{i,1}, b_{i,2}, \ldots b_{i,n+1}\}$ of $B_i$ are taken from the positions at M marked by 2n coordinates $\{(i_1,j_1),$ $(i_2,j_2), \ldots (i_n,j_n)\}$ where $l^{e_m}$ occurs within $L^{e_m}$. Thus, determining these coordinates, we get the elements of $B_i$. At 110, from the index i it is straightforward to derive $e_m$, which identifies the Latin square $L^{e_m}$ used to pick n of the elements of $B_i$. At 112, the positions of element $l^{e_m}$ determine a transversal in $L^{e_m}$, then $l^{e_m}$ occurs once in each row of $L^{e_m}$. Thus, $l^{e_m}$ occurs at the positions $\{(1,j_1), (2,j_2), \ldots (n,j_n)\}$. Assuming and $l^{e_m}$ known, using Equation 1, we have:

$$l^{e_m}=(e_m \times 1)+e_{j_1}, e_{i_1}=1$$

$$l^{e_m}=(e_m \times 2)+e_{j_2}, e_{i_2}=2$$

$$\ldots$$

$$l^{e_m}=(e_m \times n)+e_{j_n}, e_{i_n}=n$$

At 114, we solve these equations, which produces a vector V of n distinct values $(e_{j_1}, e_{j_2}, e_{j_n}) \in F_n$. As noted, elements $e_1$, $e_2, \ldots e_n$ from $F_n$ are sequentially used to calculate each element $l_{ij}^{e_m}$ of the matrix $L^{e_m}=||l_{ij}^{e_m}||$, i.e. element $e_1$ is used to calculate the elements at the positions $\{(1,1), (2,1), \ldots (n,1)\}$, element $e_2$ is used to calculate the elements at the positions $\{(1,2), (2,2), (3,2), \ldots (n,2)\}$ and so forth. In other words, each value $(e_{j_1}, e_{j_2}, e_{j_n}) \in F_n$ determines the coordinates $\{(1,j_1), (2,j_2), \ldots (n,j_n)\}$ where $l^{e_m}$ occurs, e.g. if for $i_3=3$, $e_{j_3}=2$ then $j_3=2$ ($l^{e_m}$ occurs at $\{(1,j_1), (2,j_2), (3,2) \ldots (n,j_n)\}$).

Finally, at 116, these coordinates are mapped to elements of matrix M, it is now straightforward to determine n out of n+1 the elements of $B_i$. Now, we have a block of the Affine Plane. Adding the integer $n^2+2+e_m$ to the block, we get the block $\{b_{i,1},b_{i,2},\ldots b_{i,n+1}\}=B_i$. Generating a block of FPP with this method requires (at most) n additions and n multiplications in $F_n$.

Figure 6:
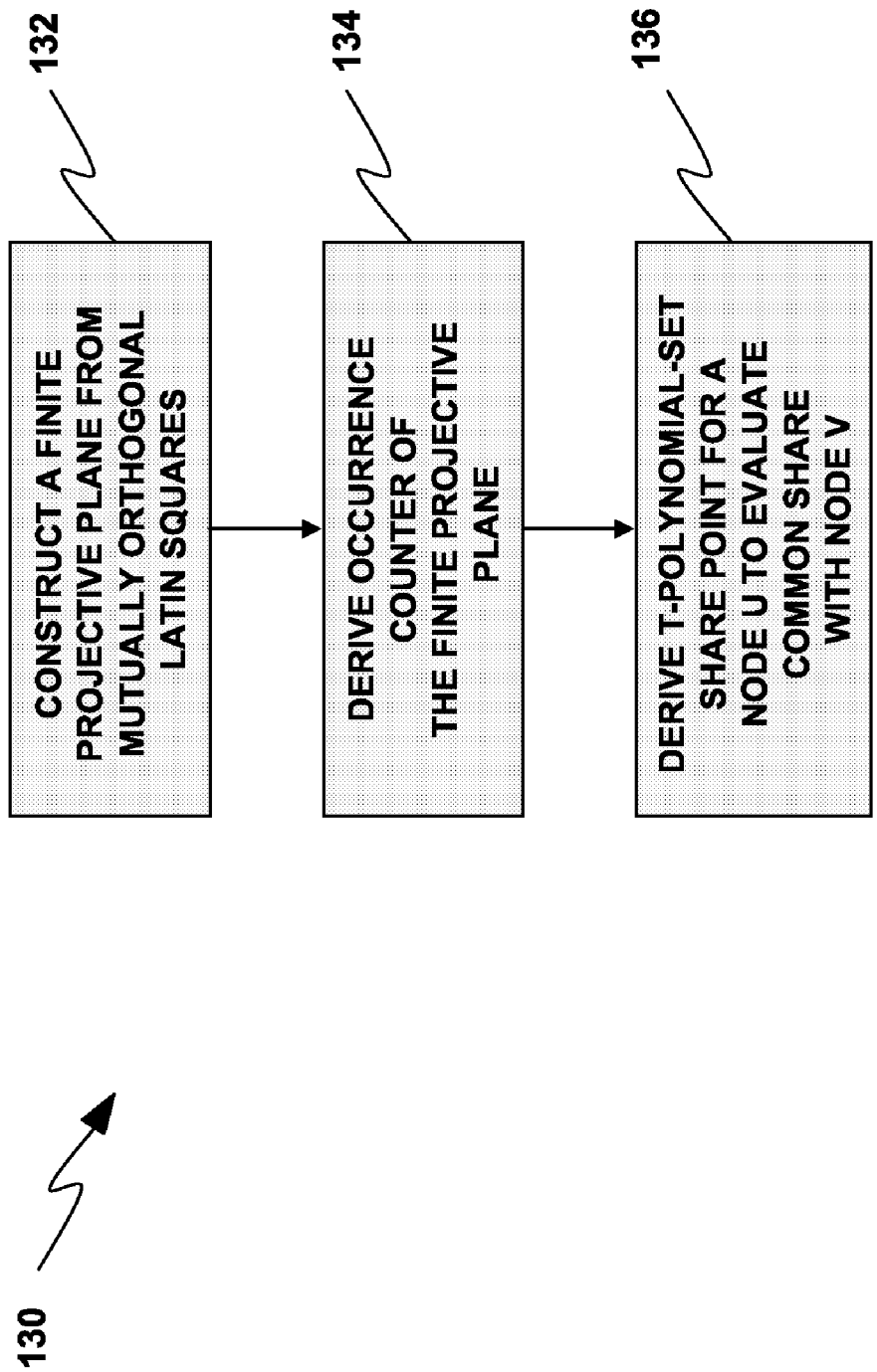
FIG. 6 illustrates a methodology to derive a t-polynomial-set share evaluation point.

FIG. 6 illustrates a method 130 to derive a t-polynomial-set share evaluation point. To derive the point $p_v$, where node u evaluates its share $F_k(p_u,y)$ to generate a key $K_{uv}$, node u must follow a simple process enabled by the properties of the FPP.

As noted above, $i_p$ is the order of a node v in the distribution of t-polynomial-set shares according to block $B_i \in$ FPP, $1 \leq i \leq n^2+n+1$. Assume a share of t-polynomial-set $F_k(x,y)$ has been distributed to v. The process described below enables the derivation of the point $p_v \in Fq'$ where v's share $F_k(p_v,y)$ is evaluated. It is assumed that $p_v=s_k \lfloor N'/(n+1) \rfloor + i_p$, where $s_k$ quantifies the number of occurrences of $F_k(x,y)$ in blocks $B_j \in$ FPP, j=1 ... i.

At 132, because FPP is constructed from MOLS, its first $n^2$ elements occur once in each group of n subsequent blocks $B_{1+t}, B_{2+t}, \ldots B_{n+t}, t=0, n, 2n, 3n \ldots n \times n$. Then, at 134, given a block index i, $1 \leq i \leq n^2+n$, and a t-polynomial-set index k, $k \leq n^2$, deriving its occurrence counter $s_k$ is trivial, i.e. $s_k=\lfloor i/n \rfloor$. Each element of the form $k=n^2+j$, j=1 ... n+1, occurs n times in the group of blocks $B_{i+n(j-1)}$, i=1 ... n. In this case, $s_k=i-n(j-1)$. At 136, the elements $k=n^2+j$, j=1 ... n+1 of block $B_{n^2+n+1}$ occur for the n+1-th time within the FPP. Thus, given a t-polynomial-set index k, a block index i, and the order n of FPP, it is straightforward for a node u to derive the point $p_v$ to evaluate its common share $F_k(p_u,y)$ with node v.

Unlike previous random key pre-distribution methods, the subject embodiments enable two randomly selected sensor nodes to directly find a common key to authenticate independently of the size and density of the BSN (or of the neighborhood in DSN terms). Additionally, sensor nodes can roam through different BSNs and still authenticate and/or establish secure communications. BSN security works without requiring active or conscious participation of BSN human users.

Operational Key Management

Figure 7:
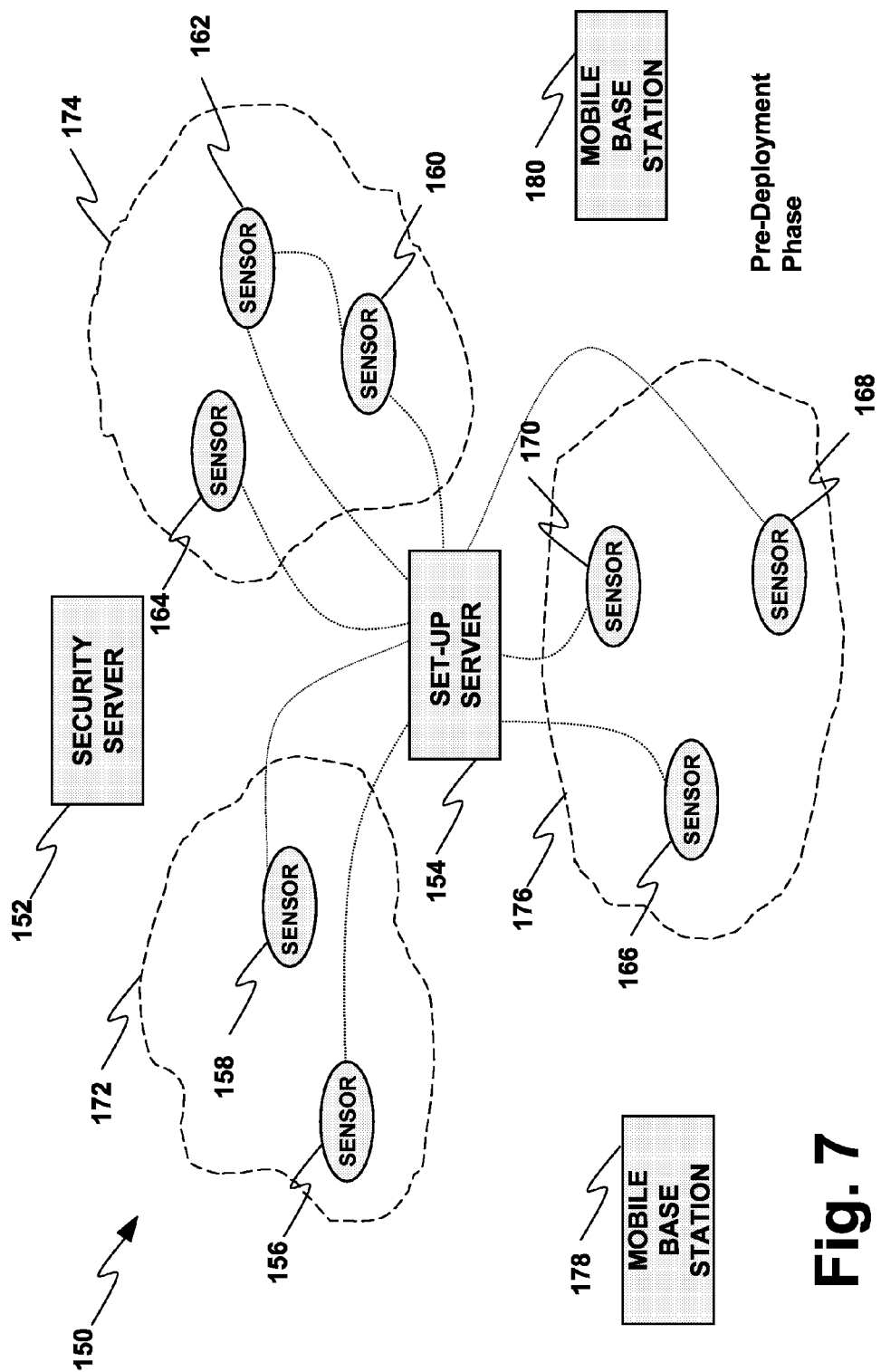
FIG. 7 illustrates a mobile sensor system that employs a set-up server to configure keying material in a plurality of sensors during a pre-deployment phase.
Figure 8:
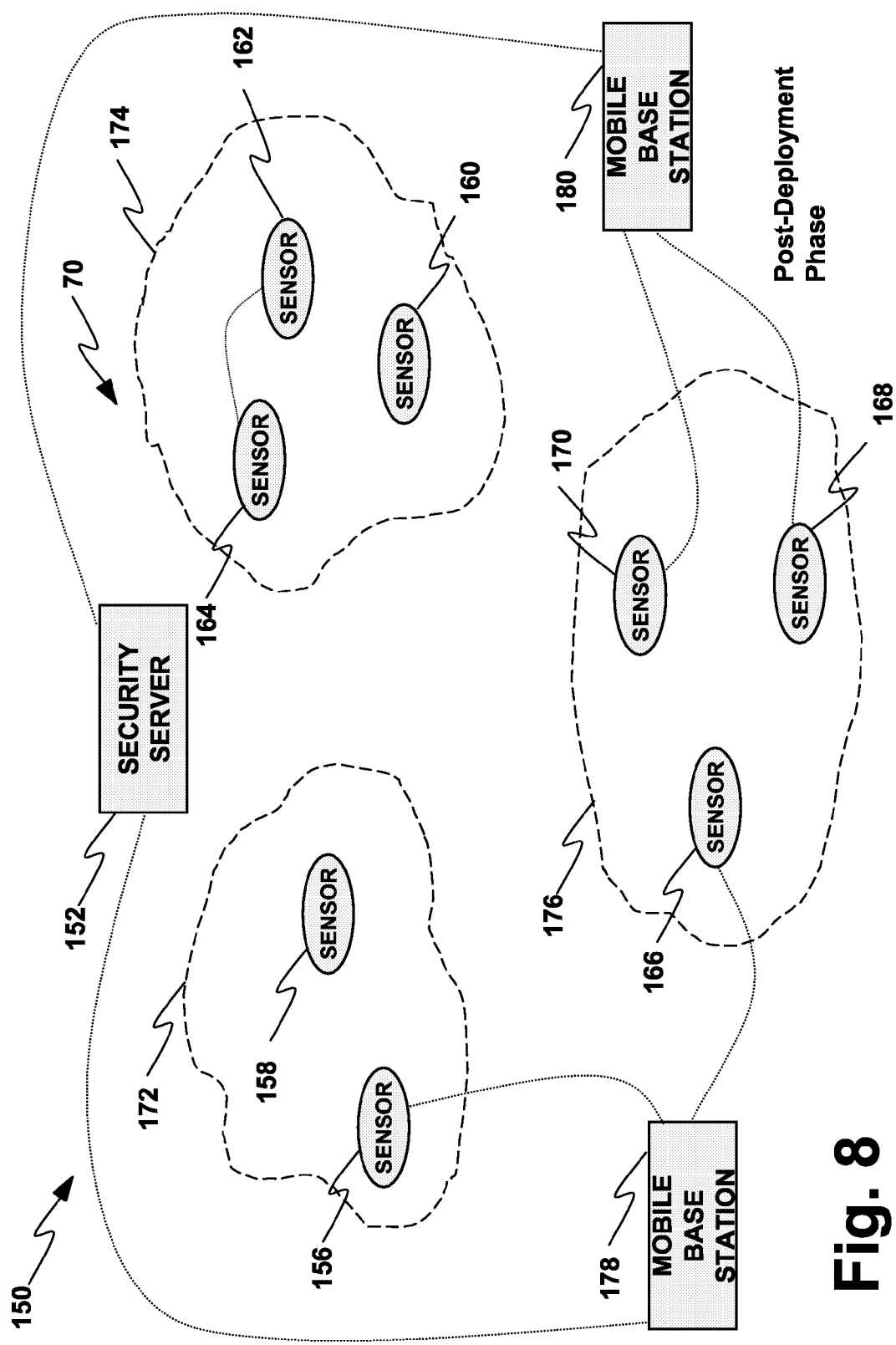
FIG. 8 illustrates a mobile sensor system that employs a security server and base stations to enable secure communication between a plurality of sensors and corresponding body sensor networks in the mobile sensor system during a post-deployment phase.

FIGS. 7 and 8 illustrate a system 150 that includes a security server 152, a set-up server 154, a plurality of wireless sensors 156, 158, 160, 162, 164, 166, 168, 170, a plurality of body sensor networks 172, 174, 176 and mobile base stations 178 and 180. FIG. 7 shows the system 150 before the sensors 156-170 are deployed. FIG. 8 shows the system 150 after the sensors have been deployed. In one example, the security server 152 and/or the setup server 154 are dedicated servers used for security. The security server 152 is a security dedicated server, which has an active participation in security before and after the deployment of sensors. The setup server 154 is a security dedicated server, which has an active participation in security only before the deployment of sensors. After deployment of sensors 156-170 and base stations 178, 180, it has continuous or sporadic connection exclusively to mobile base stations. As illustrated in FIG. 8, once deployed, the sensors 156-170 do not connect to the security server 152. As illustrated in FIG. 7, the mobile base stations 178, 180 and the sensors 156-170 can connect to the set-up server 154 only in the pre-deployment phase, i.e. in an initial configuration phase before the devices are used.

The wireless sensors 156-170 are responsible for collecting and transferring patient medical data. In one example, a sensor 156 may establish wireless connections to a second arbitrary sensor 158 and/or to a base station 180. Sensor nodes are memory, battery and CPU constrained. In a hospital, there might be thousands of sensors. One or more BSNs is a collection of wireless networked sensor nodes. The nodes of a BSN may be attached to one or more patients. BSNs are typically bandwidth constrained. In a hospital, there might be hundreds or thousands of BSNs (e.g., one for each patient). The mobile base stations (BS) 178, 180 are mobile devices used to access data on and to configure BSNs. BSs are typically moderate resource and power devices. In a hospital, there might be hundreds or thousands of BSs.

The operational key management solution consists of the following methods:

1. Key pre-distribution. The set-up/security server distributes basic key material to each sensor, following a basic key pre-distribution scheme, and to each mobile base station, following different approaches. This is done in the configuration phase before the sensors or base stations are deployed e.g. in a hospital.
2. Pre-Distributed Key Certification. An arbitrary BS accesses the sensors forming an arbitrary BSN to distribute key certificates $KC_I$, which validate the pre-distributed key material in the previous step for a given future interval $I_I$.
3. Key Establishment. Two arbitrary sensors u and v generate a unique pairwise key $K_{uv}$, by using the pre-distributed key material and the valid key certificates.

Basic Key Pre-Distribution Schemes

Various methodologies can be employed to implement symmetric key pre-distribution schemes (e.g., Blom, Blundo et al. or DPKPS), which can be used as basic framework of the schemes described herein.

Figure 9:
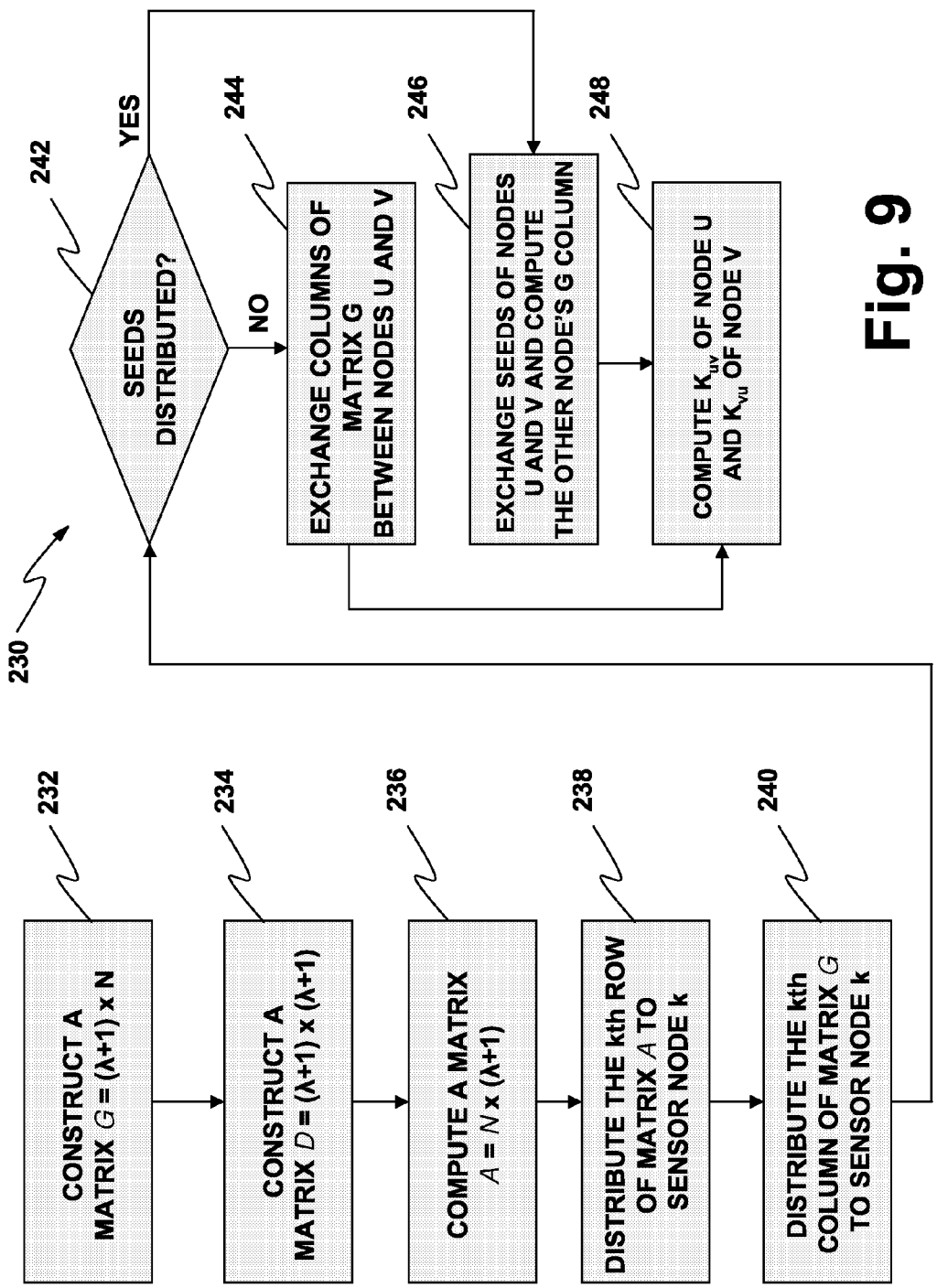
FIG. 9 illustrates a key pre-distribution method that employs a Blom symmetric key pre-distribution scheme.

FIG. 9 illustrates a key pre-distribution method 230 that employs a Blom symmetric key pre-distribution scheme. Blom scheme allows any pair of nodes in a network to derive a pairwise secret key. Based on the work by Du et al. (*A pairwise key pre-distribution scheme for wireless sensor networks*. In Proc. of the 10th ACM Conference on Computer and Communications Security (CCS), 2003, pp. 42-51) some slight modifications to Blom's original scheme were added, in accordance with the subject embodiment, to make it suitable for BSNs.

Blom's scheme can be used as follows. During the pre-deployment phase, at 232, a setup server constructs a $(\lambda+1) \times N$ matrix G over a finite field $F_q$, where N is the size of the group of interoperable nodes, which will potentially meet in different BSNs, and q is a number large enough to accommodate a cryptographic key. G is considered as public information, i.e. any sensor can know the contents of G, including potentially unscrupulous users. At 234, the setup server creates a random secret $(\lambda+1) \times (\lambda+1)$ symmetric matrix D over $F_q$, and, at 236, computes an $N \times (\lambda+1)$ matrix $A=(DG)^T$, where $(DG)^T$ is the transpose of DG matrix. Because D is symmetric, K=AG is a symmetric matrix. Therefore, $K_{uv}=K_{vu}$, where $K_{uv}$ is the element in K located in the uth row and vth column. $K_{uv}$ (or $K_{vu}$) is used as the pairwise key between node u and node v. Finally, for k=1, 2, ... N, the setup server distributes:

1. at 238, the kth row of matrix A to node k, and
2. at 240, the kth column of matrix G to node k. Alternatively, to save storage requirements, a seed G(k) to generate the kth column of matrix G can be distributed to node k.

At 242, a determination is made if seeds were distributed. If not, after the deployment phase, at 242, when nodes u and v need to find the pairwise key between them, they first exchange their columns of G. Alternatively, at 244, if seeds have been distributed, the nodes u and v exchange seeds and compute the other node's G column. Then, at 246, using their private rows of A, the nodes u and v can compute $K_{uv}$ and $K_{vu}$, respectively. Because G is public information, its columns (or seeds) can be transmitted in plain text.

Figure 10:
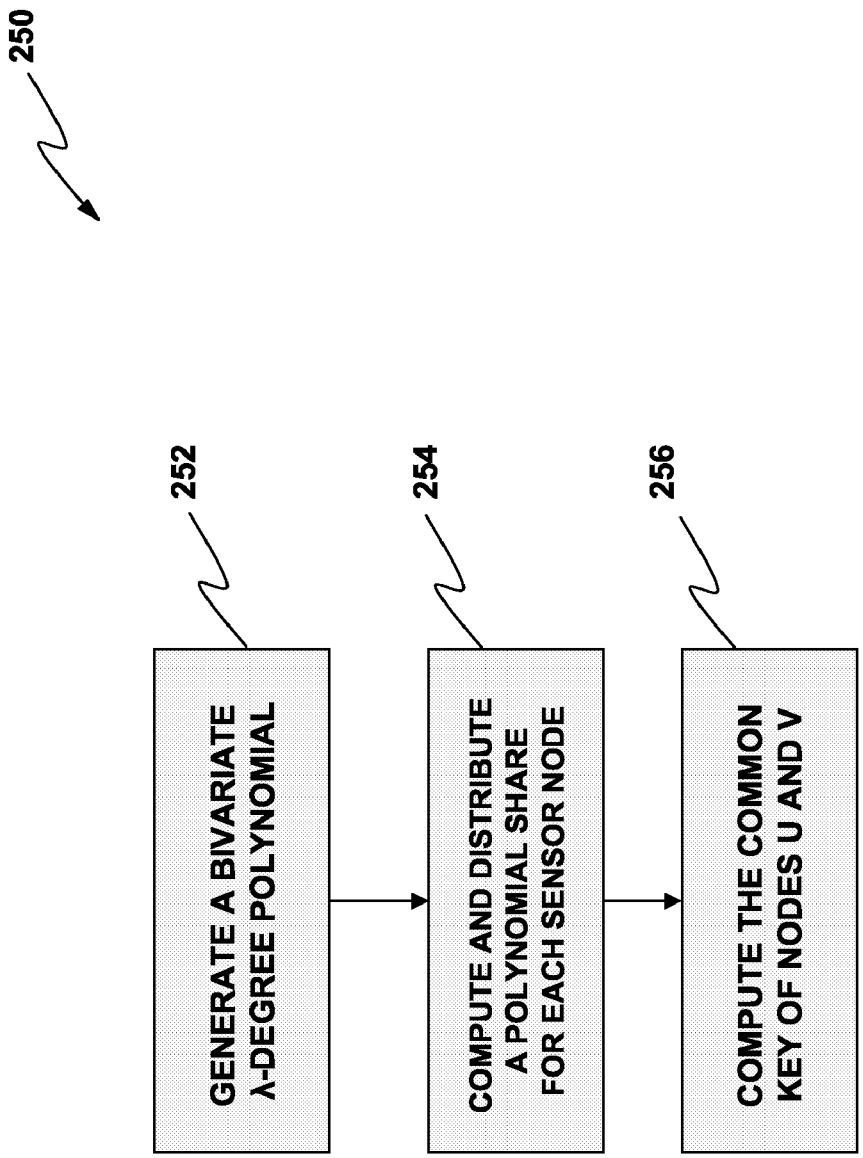
FIG. 10 illustrates a key pre-distribution method that employs a Blundo scheme for key pre-distribution.

Alternatively, as illustrated in FIG. 10, method 250 utilizes a Blundo scheme for key pre-distribution. Blundo et al. proposes a polynomial-based key pre-distribution protocol to derive group keys. For groups of two users, Blundo's scheme is a particular case of Blom's scheme with a singular advantage: there is no communication overhead during the pairwise key establishment process. The special case of polynomial-based pairwise key establishment in the context of BSNs is addressed below.

At 252, the setup server randomly generates a bivariate k-degree polynomial $$f(x, y) = \sum_{i,j=0}^{\lambda} a_{ij} x^i y^j$$

over a finite field Fq, where q is a prime number large enough to accommodate a cryptographic key, such that it has the property of f(x, y)=f(y, x). It is assumed that each sensor has a unique identifier (ID). At 254, the setup server computes and distributes a polynomial share of f(x, y) to for each sensor u, i.e. f(u, y).

At 256, for any two sensor nodes u and v, node u can compute the common key $K_{uv}$=f(u, v) by evaluating f(u, y) at point v, and node v can compute the same key $K_{vu}$=f(v, u)=f(u, v) by evaluating f(v, y) at point u. The security proof in Blundo et al. ensures that this scheme is unconditionally secure and $\lambda$-collusion resistant. That is, the coalition of no more than $\lambda$ compromised sensor nodes knows nothing about the pairwise key between any two non-compromised nodes.

As a preferred alternative, the DPKPS can be used for the initial pre-distribution of pairwise keys to sensors.

Pro-active methods are employed to increase trust in and control the usage of the keys pre-distributed with any of the basic key pre-distribution schemes and thus decrease the effect of compromised nodes.

It is to be assumed that the lifetime of all the sensor nodes is divided into n+1 common long intervals of duration T, denoted as $I_0, I_1, I_2, \ldots$ and $I_n$, i.e. sensor nodes are all loosely synchronized to a global reference time even when connected in different BSNs.

Figure 11:
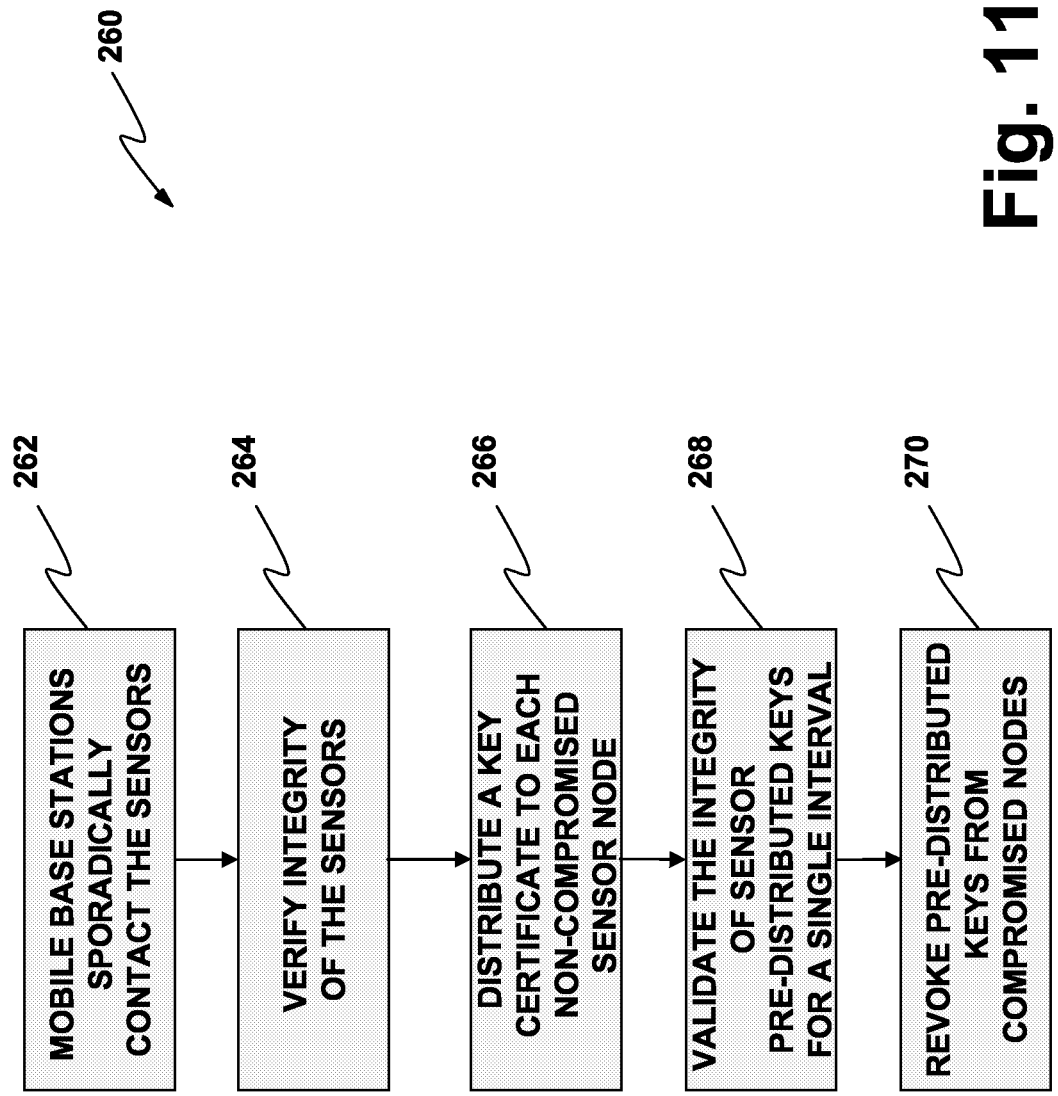
FIG. 11 illustrates a method to certify pre-distributed keys.

FIG. 11 illustrates a methodology 260 to certify pre-distributed keys and is a summary of the key certification methods in FIGS. 12-15 below. At 262, during each time interval $I_{l-1}$, mobile base stations (BS) sporadically contact the sensors (wherever they are) and, at 264, after verifying the integrity of sensors, at 266, distribute a key certificate $KC_l$ to each non-compromised sensor node. At 268, the key certificate $KC_l$ validates the integrity of sensor pre-distributed keys for a single interval $I_l$, i.e. pre-distributed keys are valid for time interval $I_l$. Similarly, at 270, a compromised node u does not receive the key certificate $KC_l$, and thus its pre-distributed keys are revoked.

In the following, a series of methods 280, 310, 330 and 370 are presented; each later scheme improves the previous one by addressing some of its limitations. The difference between methods 280, 310, 330 and 370 resides in the level of connectivity among base stations and between base stations and the security server. These methods also differ in how a key certificate is generated or agreed.

Figure 12:
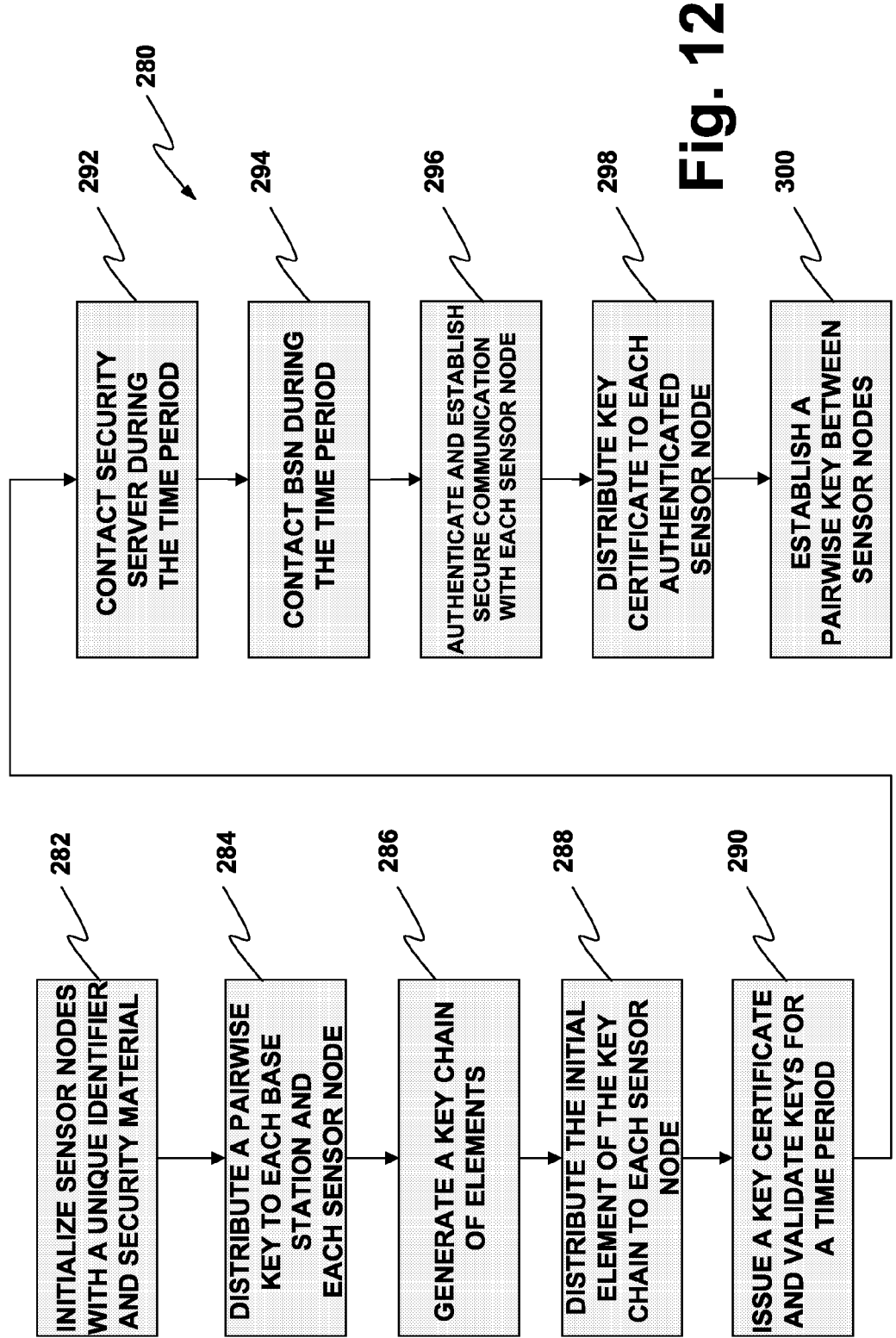
FIG. 12 illustrates a method to manage pre-distributed keys.

FIG. 12 illustrates the methodology 280 employed to centrally issue global key certificates. In this section, a security server resides in a secure place different to the BSNs deployment area. As noted above, a security server is a security dedicated server, which has an active participation in security before and after the deployment of sensors. A setup server is a security dedicated server, which has an active participation in security only before the deployment of sensors. Therefore, a set-up server remains offline after sensors are deployed. It is also assumed that one or more mobile base stations are present sporadically and shortly at the BSN. The base stations also have sporadic contact with the security server. Because base stations are expensive nodes, they employ tamper-proof hardware and are not limited in computing power or memory. Thus, the number of mobile base stations is much lower than the number of sensor nodes. Because base stations are typically not left unattended and they are only present at the BSNs deployment area sporadically, they are not prone to be captured or compromised.

Since sensor nodes are mobile, we cannot assume that a base station will always be in wireless range of a BSN (e.g., a patient with a couple of sensors attached to his body having a walk through the hospital garden). Nevertheless, since the purpose of a BSN is to collect data to be delivered to an end user, it is assumed that the BSN will sporadically be in wireless range of a base station. This is an important requirement for BSNs, otherwise the information collected by the sensor nodes may be lost due to limitation of storage capacity in sensor nodes. The limitations of having static dedicated servers for sensor network security are well known. For instance, an unscrupulous individual may try to mount denial of service (DoS) attacks to the dedicated servers. Such limitations disappear if the dedicated servers are replicated, mobile and not always present at the BSN. In BSN environments, the existence of mobile base stations is assumed. For example, in one approach a doctor downloads data from the patient BSN at the garden. In the following, the terms base stations refer to mobile base stations, which can be used for security.

Following either of the basic key pre-distribution schemes (e.g., Blom, Blundo et al., DPKPS) before deployment, at 282 sensor nodes are initialized with a unique identifier and security material. Basic key pre-distribution schemes are not employed to provide pairwise keys between sensor nodes and base stations to avoid the risk that a coalition of λ compromised nodes could impersonate a base station. Additionally, a group key is not proposed to be shared between a base station BSi and the sensor nodes because compromise of a single node would compromise the security of the rest of nodes and, thus render the base station BSi inoperable for security. Instead, at 284 following a trivial key pre-distribution scheme, for each base station BSi=1, . . . , M, and each sensor node u=1, . . . , N, N>>M, the security server randomly picks and distributes a pairwise key $K_{u,BSi}$. This scheme enables each sensor node to securely communicate with a base station BSi. It is unconditionally secure and the additional storage capacity required in nodes is only M×log q. Finally, at 286, the security server generates a key chain of n+1 elements $K_0$, $K_1$, . . . , $K_n$ by randomly picking a secret $K_n$ and generating $K_k=F(K_{k+1})$ for k=0, 1, . . . , n−1 where F is a pseudorandom function. At 288, the security server distributes the initial element of the key chain $K_0$ to each sensor node u=1, . . . , N. With the pseudorandom function F, given $K_k$ in the key chain, any sensor node can compute all the previous keys $K_m$; $0 \leq m \leq k$, but the later keys $K_m$; $k+1 \leq m \leq n$ cannot be computed. Thus, with the knowledge of the initial key $K_0$, the sensor node can authenticate any key in the key chain by merely performing pseudorandom function operations. The second element of the key chain $K_1$ is initially distributed to each base station BSi.

Base stations have a similar role to delegated certification authorities of a public key infrastructure with the security server as the trusted root. At 290, a base station issues a key certificate (KC) to a non-compromised node, which validates its pre-distributed keys for a limited period of time T. After the time period T, the pre-distributed keys of a node are not valid anymore. The elements of the key chain $K_0$, $K_1$, . . . , $K_n$ are used sequentially as the key certificate for each interval $I_1$, $I_2$, . . . and $I_n$. In the following, the elements of the key chain are referred to as key certificates $KC_0$, $KC_1$, . . . , $KC_n$.

At 292, during a time interval $I_l$ each and every base station BSi will sporadically contact the security server. As base stations and security servers are powerful nodes, they can use public key cryptography to secure their communications. The security server will distribute the next key certificate $KC_{l+1}$ to each base station BSi, BSi=1, . . . , M. Note that, in the improbable event of a base station compromise, only one certificate is compromised without risking future key certificate disclosures, i.e. the compromised base station itself cannot compute the next key certificate. The compromise of the base station is easy to detect, since it will not contact the security server in the next time interval $I_{l+1}$. Thus, a compromised base station will not get key certificates in subsequent intervals to the interval of the compromise. In such an event though, the rest of base stations should inform all the sensor nodes about the identity of the compromised base station BSi. Each sensor node u will erase its shared key $K_{u,BSi}$ with BSi it and thus remove BSi from its list of trusted base stations.

At 294, during a time interval $I_l$, at least one arbitrary base station BSi will sporadically and shortly contact the BSN. At 296, using the appropriate keys $K_{u,BSi}$ the base station BSi will authenticate and establish secure communication with each non-compromised sensor node forming part of the BSN. At 298, to each authenticated sensor node the base station will distribute the key certificate $KC_{l+1}$ corresponding to time interval $I_{l+1}$. Thirdly, the sensor node will verify that $h(K_{l+1})$ equals the stored $K_l$. In negative case, the sensor node can certainly infer that the base station BSi has been compromised and, thus, reject the faked key certificate $KC'_{l+1}$.

At 300, a key is established. If two nodes need to establish a pairwise key, they first derive a pairwise key, as explained above. Then, they check that both have a valid key certificate from a base station BSi. The key certificate validation process performed by two sensor nodes u and v must be secure to prevent an unscrupulous user from obtaining a valid key certificate. Therefore, this process cannot require first exchanging respective key certificates and then validating the key certificates by internally checking that they were issued for the current time interval Il and that they can be authenticated by the initial key K0 (or derived authenticated keys Km; m<l) of the key chain. Instead, both sensor nodes run a zero knowledge (ZK) protocol to prove that both have a valid certificate without actually revealing it. The ZK protocol is given below:

| | |
|---|---|
| U → V: Nu | (1) |
| V → U: Nv | (2) |
| U: KZNPuv = MACKCl (Nu\|\|Nv) | (3) |
| V: KZNPvu = MAC KCl (Nv\|\|Nu) | (4) |
| U: MACKuv (KZNPuv) | (5) |
| U: MACKvu (KZNPvu) | (6) |
| U → V: MACKuv (KZNPuv) | (7) |
| V → U: MACKvu (KZNPvu) | (8) |

At (1), node u sends a self-generated nonce Nu to node v. At (2), node v sends a self-generated nonce Nv to node u. At (3), u uses the key certificate KCl and both nonces Nu and Nv to compute a message authentication code (MAC). Both nonces must be included in message (3) and (4) to avoid reflection attacks, i.e. v, in the case it does not know KCl, tricks u into computing a KZNP that v can then use to successfully run the ZK protocol with a third node w. The computed MAC constitutes a key for the ZK protocol KZNPuv. With a similar procedure, at (4) v computes the same ZK protocol key KZNPvu. Note that KZNPuv≠KZNPvu. Both ZK protocol keys must be different to avoid that v, in the case it does not know KCl, just replays message (7) to run the ZK protocol successfully. At (5), u computes a MAC of KZNPuv using the pairwise key Kuv. At (6), v computes a MAC of KZNPvu using the pairwise key Kvu. These two steps are necessary to associate the knowledge of KCl to u and v, respectively. They also counter against an attacker eavesdropping messages exchanged in (7) and (8). Finally, u validates that v knows KCl: following the steps that v does in (4) and (7), u can calculate a piece of information to compare with the information received from v in (8). Node v can follow a similar procedure to validate u's knowledge of KCl. Note that, because (7) and (8) exchanged messages are MACs computed with information internally stored by nodes u and v, respectively, and no further information is disclosed, no information about KCl is revealed.

Figure 13:
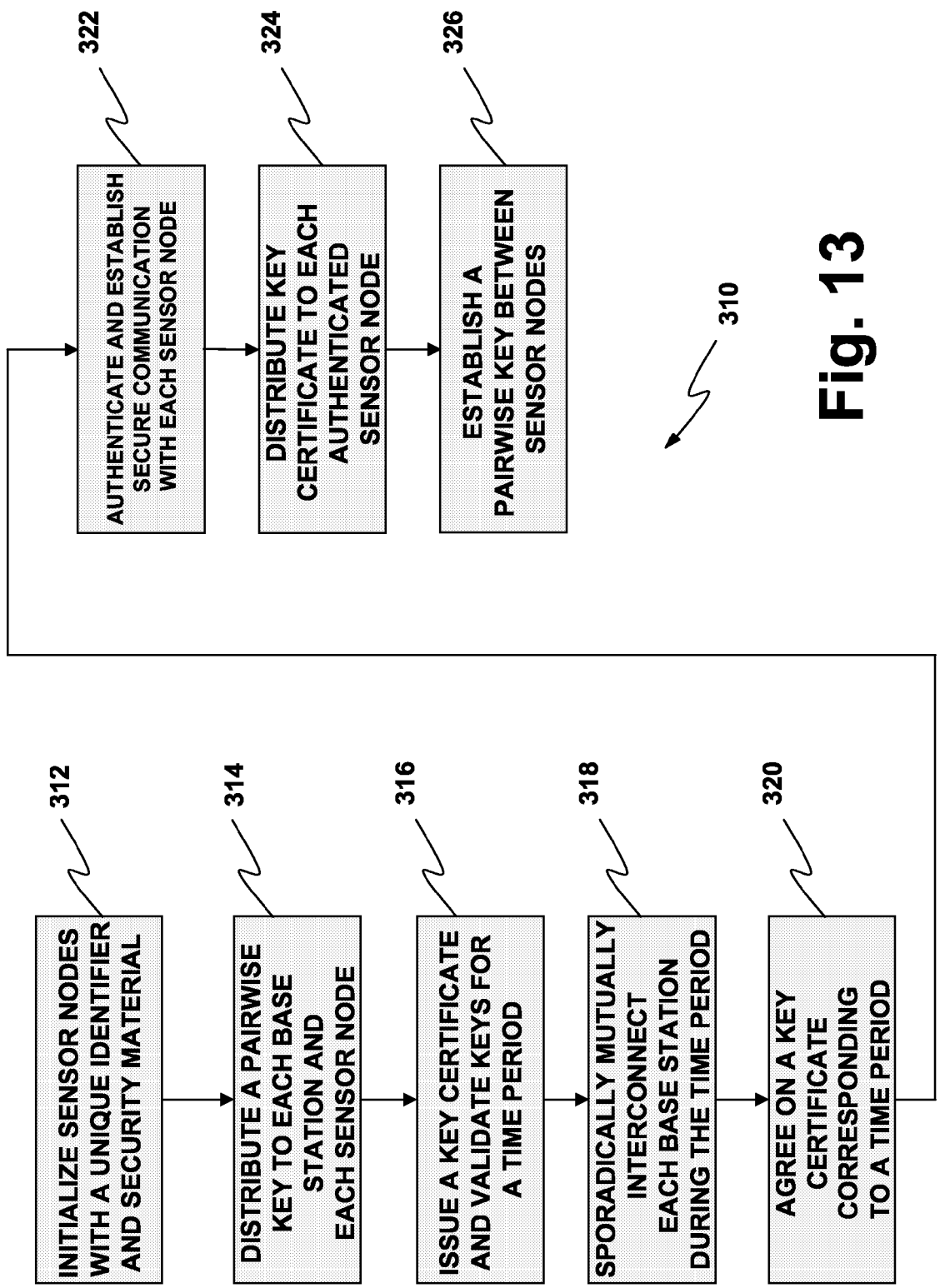
FIG. 13 illustrates a method to manage pre-distributed keys.

FIG. 13 illustrates the methodology 310 to provide global key certificates agreed centrally. Method 280 from FIG. 12 has an important drawback for some applications: demanding the base stations BSi to have contact with the security server may be unfeasible in those applications. Nonetheless, in many applications, the base stations will have mutual sporadic interconnection some time before the next visit to the BSNs. For instance, to globally exchange information collected in different BSNs. In method 310, we exploit such a fact.

In method 310, we assume an offline set-up server, which resides in a secure place different to the BSNs deployment area. We also assume the existence of a number of mobile base stations BSi, BSi=1, . . . , M, present sporadically and shortly at the BSN. However, in method 310, the base stations do not have sporadic contact with the set-up server after the deployment phase. Instead, they sporadically and shortly mutually interconnect. The rest of assumptions for the base stations discussed in method 280 hold in method 310.

At 312, following either of the basic key pre-distribution schemes, before deployment, sensor nodes are initialized with a unique identifier and security material. At 314, following a trivial key pre-distribution scheme, for each base station BSi=1, ..., M, and each sensor node u=1, ..., N N>>M, the security server randomly picks and distributes a pairwise key $K_{u,BSi}$.

Base stations have a similar role to cross-connected certification authorities of a public key infrastructure. At 316, a base station issues a key certificate to a non-compromised node, which validates its pre-distributed keys for a limited period of time T. After the time period T, the pre-distributed keys of a node are not valid anymore. At 318, during a time interval $I_{l-1}$, each and every base station BSi will sporadically mutually interconnect. As base stations are powerful nodes, they can use public key cryptography to secure their communications. At 320, the base stations will agree on a key certificate $KC_{l+1}$, corresponding to time interval $I_{l+1}$.

During a time interval $I_l$, at least one arbitrary base station BSi will sporadically and shortly contact the BSN. At 322, using the appropriate keys $K_{uBsi}$ the base station BSi will authenticate and establish secure communication with each non-compromised sensor node forming part of the BSN. At 324, to each authenticated sensor node the base station will distribute the key certificate $KC_{l+1}$ corresponding to time interval $I_{l+1}$.

After the time interval $I_l$, each base station BSi forgets the key certificate $K_{l+1}$. Therefore, at maximum a base station BSi keeps a key certificate $KC_{l+1}$ two time intervals $I_{l-1}$ and $I_l$. Note that, in the improbable event of a base station compromise, only two key certificates $KC_l$ and $KC_{l+1}$ are compromised without risking future key certificate disclosures, i.e. the compromised base station cannot foresee the next key certificate to $KC_{l+1}$. The compromise of the base station is easy to detect, since it will not contact the rest of base stations in the next time interval $I_{l+1}$. In such an event though, the rest of base stations should inform all the sensor nodes about the identity of the compromised base station BSi and, if possible, distribute a renewed key certificate $KC^{renewed}_{l+1}$ for the, now, current time interval $I_{l+1}$. Each sensor node u will erase its shared key $K_{u,Bsi}$ with BSi and thus remove BSi from its list of trusted base stations.

At 326, a key is established. If two nodes need to establish a pairwise key, they first derive a pairwise key as explained above. Then, they check that both have a valid key certificate by running a ZK protocol, as explained in method 280.

Figure 14:
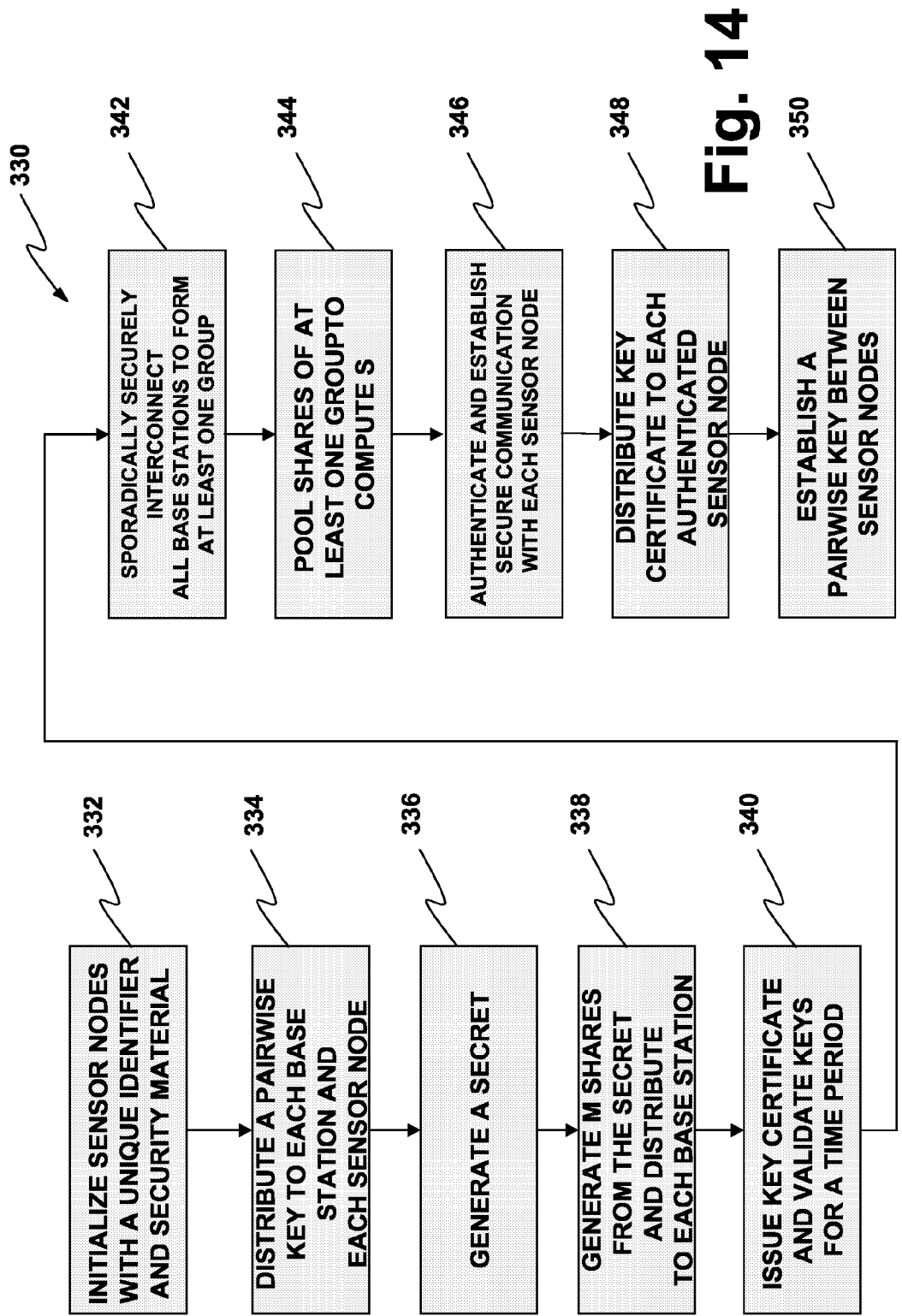
FIG. 14 illustrates a method to manage pre-distributed keys.

FIG. 14 illustrates the methodology 330 that allows global key certificates to be agreed locally. Method 300 has an important drawback for some applications: demanding all the base stations BSi to be mutually interconnected during a time interval $I_l$ may be unfeasible or impractical in those applications. Still, base stations will certainly sporadically interconnect in small sets some time before the next visit to the BSNs. For instance, to exchange information collected in different BSNs. In method 330, such a fact is exploited.

At 332, following either of the basic key pre-distribution schemes, before deployment, sensor nodes are initialized with a unique identifier and security material. At 334, following a trivial key pre-distribution scheme, for each base station BSi=1, ..., M, and each sensor node u=1, ..., N, N>>M, the set-up server randomly picks and distributes a pairwise key $K_{u,BSi}$. At 336, the security server generates a secret S. At 338, following a (t, M) threshold scheme (t≦M), the set-up server generates M shares $S_1, S_2, \ldots, S_M$ from the secret S, and securely distributes $S_i$ to each base station BSi. Any t or more base stations pooling their shares easily recover S, but any group of base stations knowing only t−1 or fewer shares cannot. Note that in the special case t=1, each base station BSi holds the actual secret S.

In this particular approach, base stations have a similar role to cross-connected certification authorities of a public key infrastructure. At 340, a base station issues a key certificate to a non-compromised node, which validates its pre-distributed keys for a limited period of time T. After the time period T, the pre-distributed keys of a node are not valid anymore.

At 342, during a time interval $I_{l-1}$, each and every base station BSi will sporadically securely interconnect forming small non-interconnected groups $G_g$, $G_1$, $G_2$ ... g<M. Each base station BSi connects to at least one group $G_g$. Therefore, the number of members of each group is $|G_g| \geq \lfloor M/g \rfloor$, where $\lfloor x \rfloor$ is the largest natural number y less than or equal to x. A group $G_g$ can be represented as $G_g = \{G_{g1}, \ldots, G_{gk}; k=|G_g|\}$. For instance, with M=7 base stations and g=3, then $|G_g| \geq 2$ and the arrangement of groups may be $G_1=\{BS2, BS3, BS6\}$ and $G_2=\{BS1, BS4, BS5\}$ and $G_3=\{BS1, BS7\}$. Note that for group $G_3$, $|G_3|=2$, and $G_{g1}=BS1$ and $G_{g2}=BS7$. A necessary condition for what now follows is that $|G_g| \geq t$, for all g. At 344, the members $G_{g1}, \ldots, G_{gk}$, of a group $G_g$, pool their shares $S_{Gg1} \ldots S_{Ggk}$ to compute S. Then, each group member independently computes the key certificate $KC_{l+1}$ for interval $I_{l+1}$ by calculating $KC_{l+1}=F(S, l+1)$. Finally, each group member forgets S.

During a time interval $I_l$, at least one arbitrary base station BSi will sporadically and shortly contact the BSN. At 346, using the appropriate keys $K_{u,BSi}$ the base station BSi will authenticate and establish secure communication with each non-compromised sensor node forming part of the BSN. At 348, to each authenticated sensor node, the base station will distribute the key certificate $KC_{l+1}$ for time interval $I_{l+1}$. As in method 300, after the time interval $I_l$, each base station BSi forgets the key certificate $KC_{l+1}$.

At 350, a key is established. If two nodes need to establish a pairwise key, they first derive a pairwise key as explained in method 300. Then, they check that both have a valid key certificate by running a ZK protocol, as explained in method 270.

FIG. 15 illustrates the methodology 370 that allows distinct key certificates to agree locally. Method 330 has a substantial operational improvement in respect to methods 270 and 300: each small fraction of base stations can manage key certificates independently and without having to contact the set-up server. Furthermore, in the improbable event of the compromise of a base station the security of all BSNs is not compromised for the rest of time intervals.

The previous schemes have an important advantage: all the sensor nodes can mutually authenticate and/or establish secure communications during a time interval $I_l$, independently of their mobility, i.e. during time interval $I_l$ a sensor node can roam through different BSNs and it is still able to communicate securely in all of them. In other words, methods 270, 300 and 330 enable the logical secure interconnection of nodes in different BSNs through a single security domain. This, in turn, has a controversial effect for security: an undetected compromised node can still connect to the BSNs in the rest of time of interval $I_l$ of the compromising, because it holds $KC_l$ and, possibly also in the next interval $I_{l+1}$, if it already holds $KC_{l+1}$. It is to be appreciated that a compromised node cannot cheat a base station. Thus, the only way of a compromised node to get $K_{l+1}$, is by receiving it before being compromised.

In some sensor applications, however, system vulnerability is less important. We refer here to applications where sensors have very low mobility. Imagine, for instance, a set of sensor attached to a human body. The body is naturally mobile but the attached sensors do not move in respect to each other.

In method 370, the BSNs are not logically securely interconnected by all sharing the same key certificate $KC_I$. Rather, in this embodiment, different BSNs may have different key certificates $KC^1_I, KC^2_I \ldots KC^m_I$, isolating the sensor nodes belonging to a BSN from the rest of nodes belonging to BSNs with different key certificates $KC^i_I$ and $KC^j_I$, $i \neq j$. In other words, the totality of sensors now belongs to different and dynamic security domains, each security domain being determined by the key certificate exclusively agreed by a group of base stations. Two sensor nodes can securely communicate if and only if they belong to the same security domain in a given time interval $I_l$.

At 372, a key is pre-distributed as described in method 330. At 374, a key certification is pre-distributed. Base stations have a similar role to root certification authorities of a public key infrastructure. At 376, a base station issues a key certificate to a non-compromised node, which validates its pre-distributed keys for a limited period of time T. After the time period T, the pre-distributed keys of a node are not valid anymore. Key certificates $KC^{BSi}_I$ and $KC^{BSj}_I$ from different base stations BSi and BSj, $i \neq j$, may not be equal.

At 378, during a time interval $I_{l-1}$, each and every base station BSi sporadically, securely interconnects forming small non-interconnected groups $G_g$, $G_1, G_2 \ldots g<M$. Each base station BSi connects to at least one group $G_g$. At 380, the members $G_{g1}, \ldots, G_{gk}$, of a group $G_g$, pool their shares $S_{Gg1} \ldots S_{Ggk}$ to compute S. At 382, each group member independently computes the key certificate $KC^g_{l+1}$ for interval $I_{l+1}$ by calculating $KC^g_{l+1} = F(S, N_{Ggl})$, where $N_{Ggl}$ is a nonce exclusive to group $G_g$ for interval $I_{l+1}$. At 384, each group member forgets S.

At 386, during a time interval $I_l$, at least one arbitrary base station BSi will sporadically and shortly contact the BSN. At 388, using the appropriate keys $K_{u,BSi}$ the base station BSi will authenticate and establish secure communication with each non-compromised sensor node forming part of the BSN. At 390, to each authenticated sensor node the base station will distribute the key certificate $KC^g_{l+1}$ for time interval $I_{l+1}$. As in previous schemes, after the time interval $I_l$, each base station BSi forgets the key certificate $KC^g_{l+1}$.

There are three special cases in method 370: initially, if each base station BSi is allowed to join only once to a group $G_g$, then it derives a single key certificate $K^g_{l+1}$. The effect is having as many different security domains as groups $G_g$. In the special case t=1, each base station BSi forms its own group $G_i$, and, thus, the effect is having so many different security domains as base stations BSi. Secondly, if a base station BSi is allowed to join n different groups $G_1, G_2 \ldots G_n$, $1<n\leq g$, then it derives n different key certificates $KC^1_{l+1}$, $KC^2_{l+1}$, $KC^n_{l+1}$. The effect is having different security domains, some of them being logically connected. Thirdly, if all base stations interconnect to the same and unique group, then they all agree in the same key certificate, and, thus, the effect is a global security domain as in method 330.

At 392, a key is established. If two nodes need to establish a pairwise key, they first derive a pairwise key as explained in method 300. Then, they check that both have a valid key certificate by running a ZK protocol, as explained in method 270. Two sensor nodes, with different key certificates, cannot establish a key.

In method 370, compromised sensor nodes cannot be used to attack sensors with different key certificates to the one held by the compromised node. However, utilizing method 370, sensor nodes with different key certificates cannot securely communicate in the same BSN. This key management system has improved resiliency against node captures without relying on any global IDs for BSNs and uses little more memory of sensors than that required by basic key pre-distribution schemes.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A wireless system for monitoring a patient, the wireless network comprising:
   a body sensor network that includes one or more wireless sensors operatively connected to the patient that collect and transfer information related to the patient's health to the wireless network;
   a set-up server that configures the one or more wireless sensors with keying materials before the one or more sensors are deployed to the wireless network, the set-up server randomly generating set $\mathfrak{S}$ of $t \times (n^2+n+1)$ $\lambda$-degree bivariate polynomials $\{f^i_j(x,y)\}_{j=1 \ldots n^2+n+1}^{i=1 \ldots i}$ over Fq' and for j=1 $\ldots n^2+n+1$, the set-up server sequentially picking t of the polynomials from $\mathfrak{S}$, and forming $n^2+n+1$ t-polynomials-sets $F_j(x,y)$, where $\lambda$ is a number of nodes in the wireless network and is an integer greater than one, n is a prime power, t is an integer greater than or equal to one, and Fq' is a finite field where q' is a prime number large enough to accommodate a cryptographic key;
   a base station that distributes a key certificate to the one or more sensors associated with the body sensor network, such that two sensors generate a unique pairwise key based at least in part upon the pre-distributed keying material and the key certificate distributed by the base station.

2. The system according to claim 1, wherein the set-up server generates a finite projective plane, $(n^2+n+1, n+1, 1)$, with elements belonging to a set S, where $|S|=n^2+n+1$ and the set S is associated such that each element in S is associated with a distinct one of the t-polynomial-set $F_j(x,y)$, where n is a prime power.

3. The system according to claim 2, wherein each sensor node receives from the set-up server n+1 t-polynomial-set shares $F_{b_{i,j}}(p_{u,j}, y)$, where $p_{u,j} \in Fq'$, $b_{i,j} \in B_i$ finite projective plane, and j $\ldots$ n+1, wherein n is a prime power.

4. The system according to claim 3, wherein a first block $B_1$ of finite projective plane has elements elements $\{b_{1,1}, \ldots b_{1,n+1}\}$, and the sensor node $(u_a)$ receives t-polynomials-set shares $F_{b_{1,1}}(p_a, y)$ to $F_{b_{1,n+1}}(p_a, y)$ evaluated at point $p_a$ of Fq', wherein a is between 1 and N'/(n+1), where N is the size of a group of interoperable nodes, which is potentially found in different wireless networks, and is an integer greater than or equal to one, and n is a prime power.

5. The system according to claim 4, wherein a second block $B_2$ of finite projective plane has elements $\{b_{2,1}, \ldots b_{2,n+1}\}$, and $b_{1,1}=b_{2,1}$, and sensor node $u_{1+N'/(n+1)}$ receives t-polynomials-set shares $F_{b_{1,1}}(p_{1+N'/(n+1)}, y)$ evaluated at point $p_{1+N'/(n+1)}$, and t-polynomials-set shares $F_{b_{2,2}}(p_1, y)$ to $F_{b_{2,n+1}}(p_1, y)$ evaluated at point $p_1$, where N is the size of a group of interoperable nodes, which is potentially found in different wireless networks, and is an integer greater than or equal to one, and n is a prime power.

6. The system according to claim 5, wherein the sensor nodes exchange their IDs, which IDs each contain the indices of the n+1 t-polynomial-set shares carried by the ID and the points $p_{u_1} \ldots p_{u_{n+1}}, p_{v_1} \ldots p_{v_{n+1}}$, as which the respective n+1 t-polynomial-set shares are evaluated, where n is an integer greater than or equal to one.

7. The system according to claim 6, wherein each sensor node finds an index k corresponding to the common t-polynomial-set $F_k(x,y)$ and the respective evaluation points $p_u$ and $p_v$.

8. The system according to claim 7, wherein node u evaluates the t λ-degree bivariate polynomials $f_k^i(p_u,y)$, for $i=1 \ldots t$, at point $p_v$ (i.e. $f_j^i(p_u,p_v)$) to obtain t partial keys and truncates the t partial keys to $\log q'$ bits and concatenates the t key segments to form a final pairwise key $K_{uv}$ of $\log q$ bits, where t is a positive integer.

9. The system according to claim 1, wherein distributing key certificates includes:
   initializing one or more of the wireless sensors;
   distributing a pairwise key to the base station and the one or more of the wireless sensors;
   generating a chain of key elements;
   distributing the initial element of the key chain to the one or more of the wireless sensors;
   issuing a valid key certificate and validating keys for a time period, contacting the security server during the time period;
   contacting a body sensor network during the time period;
   authentication and establishing secure communication with each of the one or more of the wireless sensors;
   distributing a key certificate to each authenticated sensor node; and
   establishing a pairwise key between one or more of the wireless sensors.

10. The system according to claim 1, wherein the setup server initializes one or more of the wireless sensors with a unique identifier and security material, randomly chooses and distributes a pairwise key for the base station and the one or more of the wireless sensors and the base station issues a key certificate to a non-compromised node, which validates its pre-distributed keys for a limited period of time.

11. A wireless network for monitoring a patient, the wireless network comprising:
   a body sensor network that includes one or more wireless sensors operatively connected to the patient that collect and transfer information related to the patient's health to the wireless network;
   a set-up server that configures the one or more wireless sensors with keying materials before the one or more sensors are deployed to the wireless network and a base station that distributes a key certificate to the one or more sensors associated with the body sensor network, such that two sensors generate a unique pairwise key based at least in part upon the pre-distributed keying material and the key certificate distributed by the base station, the base station issuing a key certificate to a non-compromised node, which validates its pre-distributed keys for a limited period of time;
   wherein during a time interval $I_{l-1}$ the base station sporadically mutually interconnects with one or more other base stations and agree on a key certificate corresponding to time interval $I_{l+1}$, where l is a positive integer, where after the time interval $I_l$, each base station forgets the key certificate and a key is established between the one or more of the wireless sensors.

12. The system according to claim 1, wherein the one or more wireless sensors are initialized with a unique identifier and security material, randomly chooses and distributes a pairwise key to the one or more wireless sensors and further including:
   a security server which generates a secret S, generates M shares $S_1, S_2, \ldots, S_M$ from the secret S following a threshold scheme, and securely distributes the secret S to the base station and one or more other base stations in the network, where M is a positive integer.

13. A wireless network for monitoring a patient, the wireless network comprising:
   a body sensor network that includes one or more wireless sensors operatively connected to the patient that collect and transfer information related to the patient's health to the wireless network;
   a set-up server that configures the one or more wireless sensors with keying materials before the one or more sensors are deployed to the wireless network;
   a base station that distributes a key certificate to the one or more sensors associated with the body sensor network, such that two sensors generate a unique pairwise key based at least in part upon the pre-distributed keying material and the key certificate distributed by the base station;
   a secret S, generates M shares $S_1, S_2, \ldots, S_M$ from the secret S following a threshold scheme, and securely distributes the secret S to the base station and one or more other base stations in the network, where M is a positive integer; and
   wherein during a time interval $I_{l-1}$, the one or more base stations sporadically securely interconnect forming small non-interconnected groups $G_g, G_1, G_2 \ldots g<Mi$, wherein each base station connects to at least one group $G_g$, where g and l are positive integers and each group member independently computes the key certificate for interval $I_{l+1}$ by calculating $KC^g_{l+1}=F(S, N_{Ggl})$, where $N_{Ggl}$ is a nonce exclusive to group $G_g$ for interval $I_{l+1}$ and then each group member forgets S.

14. The system according to claim 13, during a time interval $I_l$, at least one base station:
   sporadically and shortly contacts the body sensor network,
   authenticates and establishes secure communication with each non-compromised wireless sensor forming part of the body sensor network using at least one key, and
   distributes the key certificate $KC_{l+1}$ for time interval $I_{l+1}$ to each authenticated sensor node and establishes a key between the one or more wireless sensors.

15. A wireless network comprising:
   a network that includes a plurality of wireless nodes;
   a set-up server that configures each of the wireless nodes with a plurality of polynomials before the one or more nodes are deployed to the wireless network such that the nodes are configured with different combinations of the polynomials, and such that each pair of the nodes is configured with a common one of the polynomials; and
   a base station that distributes a key certificate to the one or more nodes associated with the network, such that each pair of the nodes generates a unique pairwise key based at least in part upon the common polynomial of the pair and the key certificate distributed by the base station.

16. A method to identify a first sensor in a mobile sensor system, comprising:
- developing a finite projective plane ($n^2+n+1, n+1, 1$) from a set of $n-1$ mutually orthogonal Latin squares of order n, where n is a prime power;
- discovering a common t-polynomial-set share from the finite projective plane; and
- deriving a t-polynomial-set share evaluation point by a second sensor from the first sensor's identifier.

17. The method according to claim 16, wherein for n entries in cells of an orthogonal mate $L^{e_m} = |l_{ij}^{e_m}|$ of the mutually orthogonal Latin squares, for each element $e_m$, $m=1, 2, \ldots, n$ sequentially calculating elements $l_{ij}^{e_m}$ of the orthogonal matrix.

18. The method according to claim 16, wherein the finite projective planes is constructed by constructing a matrix M by placing $n^2$ integers 1 through $n^2$ in their natural order from a first to an n-th of its rows, where n is a prime power.

19. The method according to claim 16, further including:
- deriving a point $p_v$, at which node u evaluates its share $F_k(p_u, y)$ of the t-polynomial-set share to generate a key $K_{uv}$;
- constructing the finite projective plane from the mutually orthogonal Latin square, such that the finite projective plane's first $n^2$ elements occur once in each group of n subsequent blocks $B_{1+t}, B_{2+t}, \ldots B_{n+t}, t=0, n, 2n, 3n \ldots n \times n$; and
- deriving an occurrence counter $s_k$ from a block index i, $1 \leq i \leq n^2+n$, and a t-polynomial-set index k, $k \leq n^2$, where k is a positive integer and n is a prime power.

20. The method according to claim 17, wherein indices of the t-polynomial-set shares $F_{b_{i,1}}(u,y), F_{b_{i,2}}(u,y) \ldots F_{b_{i,n+1}}(u,y)$, which a sensor u carries, are a one-to-one mapping to the elements $\{b_{i,1}, b_{i,2}, \ldots b_{i,n+1}\}$ of a $B_i \in FPP$, where $1 \leq i \leq n^2+n+1$, and where n is a prime power.

21. The method according to claim 18, wherein an Affine Plane $AG^{(2,n)}$ of order n is generated from the mutually orthogonal Latin squares in which (i) a first of n blocks $B_i$ are the rows of the matrix M, (ii) a second n blocks are columns of the matrix M, and (iii) a remaining $n^2-n$ blocks are formed by sequentially superimposing each of the matrices $L^{e_m}$ on M, and taking the elements of the matrix M which correspond to a single element $l^{e_m}$ in each of the matrices $L^{e_m}$ as the blocks, where n is a prime power.

22. A method to maximize scalability, resiliency and performance of a wireless system comprising:
- evaluating t-polynomial-set shares associated with nodes in the wireless system;
- distributing t-polynomial-set shares to the evaluated nodes in the wireless system; and
- pre-distributing a security key via a set-up server to a first node and a second node that are uncompromised and communicate on the wireless system.

* * * * *